US012773880B2

(12) United States Patent
Teramoto et al.

(10) Patent No.: US 12,773,880 B2
(45) Date of Patent: Oct. 27, 2026

(54) TIRE ABNORMALITY DETERMINATION SYSTEM, TIRE ABNORMALITY DETERMINATION APPARATUS, TIRE ABNORMALITY DETERMINATION METHOD, AND TIRE ABNORMALITY DETERMINATION PROGRAM

(71) Applicant: Sumitomo Rubber Industries, Ltd., Kobe (JP)

(72) Inventors: Masaki Teramoto, Kobe (JP); Kazuharu Tanimura, Kobe (JP); Yukinori Hashimoto, Kobe (JP); Takahiro Nishimoto, Kobe (JP); Kenji Yoneda, Kobe (JP); Yusuke Maeda, Kobe (JP); Ai Takeda, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 270 days.

(21) Appl. No.: 18/580,268

(22) PCT Filed: Jul. 21, 2022

(86) PCT No.: PCT/JP2022/028289
§ 371 (c)(1),
(2) Date: Jan. 18, 2024

(87) PCT Pub. No.: WO2023/053690
PCT Pub. Date: Apr. 6, 2023

(65) Prior Publication Data
US 2025/0083476 A1 Mar. 13, 2025

(30) Foreign Application Priority Data
Oct. 1, 2021 (JP) ................................ 2021-162680

(51) Int. Cl.
*B60C 11/24* (2006.01)
*B60C 7/14* (2006.01)

(52) U.S. Cl.
CPC ........... *B60C 11/246* (2013.01); *B60C 7/146* (2021.08)

(58) Field of Classification Search
CPC ................................ B60C 7/00; B60C 11/246
See application file for complete search history.

(56) References Cited

U.S. PATENT DOCUMENTS

2004/0050151 A1 3/2004 Kojima
2005/0110277 A1 5/2005 Adamson et al.
(Continued)

FOREIGN PATENT DOCUMENTS

JP H03-262716 A 11/1991
JP 2006-151372 A 6/2006
(Continued)

OTHER PUBLICATIONS

Extended European search report issued on Sep. 23, 2024, in corresponding European patent Application No. 22875567.4, 25 pages.
(Continued)

*Primary Examiner* — Eric S. McCall
(74) *Attorney, Agent, or Firm* — XSENSUS LLP

(57) ABSTRACT

A tire abnormality determination system can include: a related information acquisition portion that acquires deterioration-related information that may exert influence on deterioration of a non-pneumatic tire mounted on a vehicle; a first determination processing portion that determines, based on the deterioration-related information, at least one of presence or absence of a sign of an abnormality in the non-pneumatic tire and presence or absence of the abnormality in the non-pneumatic tire; and an output processing
(Continued)

portion that outputs a first determination result of the first determination processing portion to a predetermined output destination.

13 Claims, 10 Drawing Sheets

(56) References Cited

U.S. PATENT DOCUMENTS

| | | | | |
|---|---|---|---|---|
| 2010/0199756 | A1 | 8/2010 | Hanatsuka | |
| 2017/0072746 | A1 | 3/2017 | Iwamura et al. | |
| 2019/0168549 | A1 | 6/2019 | Kanbayashi et al. | |
| 2019/0255891 | A1 | 8/2019 | Makke et al. | |
| 2019/0265129 | A1 | 8/2019 | Tamura et al. | |
| 2019/0351702 | A1 | 11/2019 | Abe et al. | |
| 2022/0063347 | A1* | 3/2022 | Sharma | B60C 11/246 |
| 2022/0203783 | A1* | 6/2022 | Maeda | G01M 17/02 |
| 2022/0397486 | A1* | 12/2022 | Decoster | G01B 7/10 |
| 2023/0173852 | A1* | 6/2023 | Singh | B60C 11/243<br>73/146.2 |
| 2023/0304808 | A1* | 9/2023 | Teramoto | B60C 23/0479 |
| 2023/0306378 | A1* | 9/2023 | Teramoto | G06Q 50/40 |
| 2023/0311591 | A1* | 10/2023 | Teramoto | G06Q 50/40<br>73/146 |
| 2023/0332983 | A1* | 10/2023 | Teramoto | B60C 23/0408 |
| 2024/0319046 | A1* | 9/2024 | Teramoto | G01M 17/02 |
| 2025/0238942 | A1* | 7/2025 | Iwata | G06T 7/50 |

FOREIGN PATENT DOCUMENTS

| | | | |
|---|---|---|---|
| JP | 2015-101123 | A | 6/2015 |
| JP | 2015-217717 | A | 12/2015 |
| JP | 2018-203093 | A | 12/2018 |
| JP | 2019-001342 | A | 1/2019 |
| JP | 2021-024394 | A | 2/2021 |
| WO | 2020/250517 | A1 | 12/2020 |

OTHER PUBLICATIONS

International Search Report and Written Opinion mailed on Oct. 4, 2022, received for PCT Application PCT/JP2022/028289, filed on Jul. 21, 2022, 10 pages including English Translation.

* cited by examiner

TIRE ABNORMALITY DETERMINATION SYSTEM, TIRE ABNORMALITY DETERMINATION APPARATUS, TIRE ABNORMALITY DETERMINATION METHOD, AND TIRE ABNORMALITY DETERMINATION PROGRAM

CROSS-REFERENCE TO RELATED APPLICATIONS

The present application is based on PCT/JP2022/028289, filed Jul. 21, 2022, which claims priority from Japanese Patent Application No. 2021-162680, filed on Oct. 1, 2021, and the entire contents of each are incorporated herein by reference.

TECHNICAL FIELD

The present disclosure relates to a tire abnormality determination system capable of determining presence or absence of a sign of an abnormality or presence or absence of an abnormality in a non-pneumatic tire mounted on a vehicle.

BACKGROUND ART

There is known a non-pneumatic tire that does not require air filling (see PTL 1). The non-pneumatic tire, as is the case with a pneumatic tire, includes a tread portion that touches a travel road surface on the ground. The tread portion of the non-pneumatic tire is also called a tread ring.

CITATION LIST

Patent Literature

[PTL 1] Japanese Patent Application Publication No. 2015-217717

SUMMARY OF THE INVENTION

Problems to be Solved by the Invention

When a tread rubber constituting a tread portion of a non-pneumatic tire wears and thickness of the tread portion becomes lower than a reference value, it becomes a non-normal state (abnormal state), and the life of the non-pneumatic tire ends. In addition, the non-pneumatic tire includes, as well as the tread ring corresponding to the tread portion, a hub portion fixed to an axle, a spoke portion for holding the tread ring, and the like. There may be a case where the tread ring peels off from the spoke portion, a spoke plate of the spoke portion is damaged, the spoke portion falls out of the hub portion, or the hub portion is damaged. In such a case, if the tire was a pneumatic tire that is filled with air, it would be possible to determine an abnormality in the pneumatic tire by detecting an air pressure and a decrease of the air pressure. However, in the case of the non-pneumatic tire, since it does not use compressed air, it is not easy to determine a sign of an abnormality or an abnormality in each portion of the non-pneumatic tire.

It is therefore an object of the present disclosure to provide a tire abnormality determination system, a tire abnormality determination apparatus, a tire abnormality determination method, and a program that can determine presence or absence of a sign of an abnormality or presence or absence of an abnormality in a non-pneumatic tire, and notify a determination content thereof.

Solution to the Problems

A tire abnormality determination system according to an aspect of the present disclosure includes a related information acquisition portion, a first determination processing portion, and an output processing portion. The related information acquisition portion acquires deterioration-related information that may exert influence on deterioration of a non-pneumatic tire mounted on a vehicle. The first determination processing portion determines, based on the deterioration-related information, at least one of: presence or absence of a sign of an abnormality in the non-pneumatic tire; and presence or absence of the abnormality in the non-pneumatic tire. The output processing portion outputs a first determination result of the first determination processing portion to a predetermined output destination.

With the above-described configuration, it is possible to determine presence or absence of a sign of an abnormality or presence or absence of the abnormality that occurs in the non-pneumatic tire, and notify a determination result thereof to an owner or a driver of the vehicle, a repair business office of the vehicle, or the like via a predetermined output terminal.

Advantageous Effects of the Invention

According to the present disclosure, it is possible to determine presence or absence of a sign of an abnormality or presence or absence of the abnormality in a non-pneumatic tire, and notify a determination content thereof.

DESCRIPTION OF EMBODIMENTS

The following describes embodiments of the present disclosure with reference to the accompanying drawings as necessary. It should be noted that the following embodiments are examples of specific embodiments of the present disclosure and should not limit the technical scope of the present disclosure. In addition, in each embodiment, configurations that are common to those of another embodiment are assigned the same reference signs as those of the other embodiment, and detailed description thereof is omitted.

First Embodiment

Figure 1:
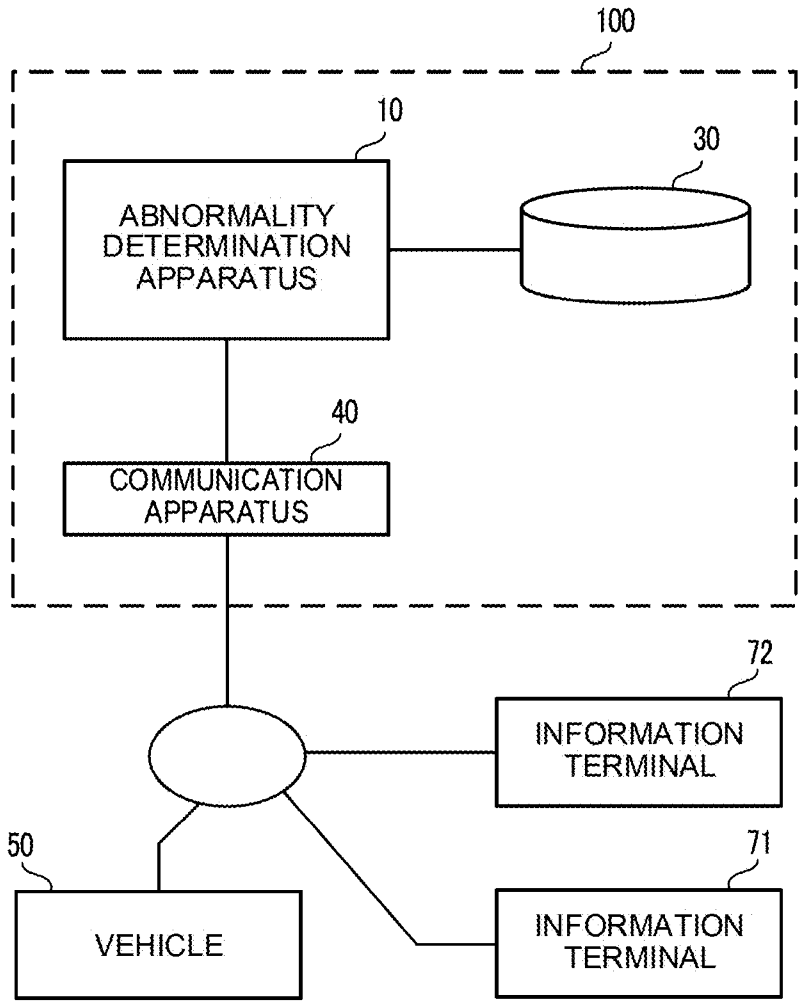
FIG. 1 is a block diagram showing a configuration of a tire abnormality determination system according to a first embodiment of the present disclosure.

FIG. 1 is a block diagram showing a configuration of a tire state determination system 100 (hereinafter merely referred to as a determination system 100) according to a first embodiment of the present disclosure. The determination system 100 is an example of a tire abnormality determination system of the present disclosure, and is configured to determine a state of a tire 1 that is used by being mounted on a vehicle 50. Specifically, the determination system 100 can determine presence or absence of a sign of an abnormality of the tire 1, and determine presence or absence of an abnormality of the tire 1.

Here, the tire 1 being a determination object is what is called a non-pneumatic tire whose inside is not filled with compressed air.

Configuration of Tire Abnormality Determination System 100

As shown in FIG. 1, the determination system 100 mainly includes an abnormality determination apparatus 10 (an example of a tire abnormality determination apparatus of the present disclosure) and a database portion 30, and they are communicably connected to each other by a wired or wireless communication network. In addition, the abnormality determination apparatus 10 is communicably connected to a communication apparatus 40. For example, the communication network is a wired communication network connected by a LAN, or a wireless or wired communication network such as a leased line or a public line.

The abnormality determination apparatus 10 is an element constituting the determination system 100. The abnormality determination apparatus 10 executes an abnormality determination process (see FIG. 7) described below using state data (an example of deterioration-related information of the present disclosure) described below transmitted from a control unit 60 (see FIG. 2) of a vehicle 50. This allows the determination system 100 to determine presence or absence of a sign of an abnormality in the tire 1, or presence or absence of an abnormality in the tire 1. In addition, the determination system 100 outputs the determination result of the abnormality determination process to a predetermined output destination. The output destination is, for example, an external apparatus such as a display device 502 (an example of a display device of the present disclosure) loaded in the vehicle 50, an information terminal 71 (an example of a terminal apparatus of the present disclosure) carried by a driver of the vehicle 50, or an information terminal 72 (an example of the terminal apparatus of the present disclosure) installed in a repair business office. The repair business office is a business office for performing a repair or maintenance of the vehicles 50, and a repair work such as replacement of the tire 1. The display device 502 and the information terminals 71 and 72 are each an example of a predetermined output destination of the present disclosure. In addition, in a case where the vehicle 50 is what is called a connected car that can function as an ICT terminal, the vehicle 50 itself may be regarded as the predetermined output destination of the present disclosure.

The abnormality determination apparatus 10 is an information processing apparatus or a server apparatus that can execute various calculation processes, and specifically is a computer, such as a server computer, a cloud server, or a personal computer, connected to the communication network. It is noted that the abnormality determination apparatus 10 is not limited to a single computer, but may be a computer system in which a plurality of computers operate in association with each other, or a cloud computing system. In addition, various processes executed by the abnormality determination apparatus 10 may be distributed to and executed by one or more processors. The abnormality determination apparatus 10 is installed with a program or computer software for operating the determination system 100.

The present embodiment describes, as an example of the determination system 100, a system in which the abnormality determination apparatus 10 performs a data communication with a single vehicle 50, the state data described below is acquired, and the abnormality determination process in which various types of calculation processes are executed is performed. However, the determination system 100 is not limited to such a configuration. For example, the determination system 100 may perform data communications with a plurality of vehicles 50, acquire the state data or the like from each of the vehicles 50, and execute the abnormality determination process for each of the tires 1 mounted on each of the vehicles 50. In this case, the abnormality determination apparatus 10 is, for example, installed in a central management center that comprehensively manages a plurality of registered vehicles 50.

The database 30 is a storage device, such as an HDD or an SSD, communicably connected with the communication network. The database 30 stores various types of data that are used in the determination system 100. The database 30 is, for example, a storage device in another server apparatus that can perform a data communication with the abnormality determination apparatus 10, or a network attached storage that can singly perform data transmission/reception on the communication network. It is noted that the database 30 may be what is called a cloud storage that is connected via the Internet. In addition, the database 30 may be a storage device installed in the abnormality determination apparatus 10, or a storage device connected with the abnormality determination apparatus 10 by a local network.

The communication apparatus 40 communicably connects the abnormality determination apparatus 10 to external apparatuses such as the vehicles 50 and the information terminals 71 and 72 by a wireless communication network using a leased line, a public line, or a mobile telephone line. The communication apparatus 40 transmits and receives data or signals to/from the external apparatuses such as the vehicles 50 and the information terminals 71 and 72. For example, the communication apparatus 40 communicates with the vehicle 50 and receives the state data described below output from the vehicle 50. Upon receiving the state data from the vehicle 50, the communication apparatus 40 transmits the received state data to the abnormality determination apparatus 10.

In addition, the communication apparatus 40 transmits results of various calculations and notifications output from the abnormality determination apparatus 10, to the vehicle 50 or the information terminal 71 or 72. The communication apparatus 40 includes an antenna (not shown). The antenna is used in wireless communications performed with a communication portion 63 (see FIG. 5) included in the control unit 60 of the vehicle 50, or a communication portion (not shown) included in each of the information terminals 71 and 72.

Each of the information terminals 71 and 72 is an information processing apparatus such as a smartphone, a tablet terminal, a notebook personal computer, or a desktop personal computer. The information terminal 71 is, for example, an information processing apparatus associated with a user who is an owner or a driver of the vehicle 50, and specifically is an information processing apparatus used by the user. In addition, the information terminal 72 is an information processing apparatus associated with a repair business office where a repair work such as a repair or maintenance of the vehicles 50 is performed, and specifically is an information processing apparatus installed at the repair business office or an information processing apparatus used by an employee of the repair business office.

Each of the information terminal 71 and 72, upon receiving calculation results of various calculation processes executed in the abnormality determination apparatus 10 or notifications output from the abnormality determination apparatus 10, displays the calculation results or the notifications on a display screen of a display portion provided in each of the information terminal 71 and 72. Accordingly, a program or computer software for receiving the various types of information from the abnormality determination apparatus 10 in corporation with the determination system 100, or for displaying the calculation results or the notifications on the display screen is installed in each of the information terminal 71 and 72.

Vehicle 50

Figure 2:
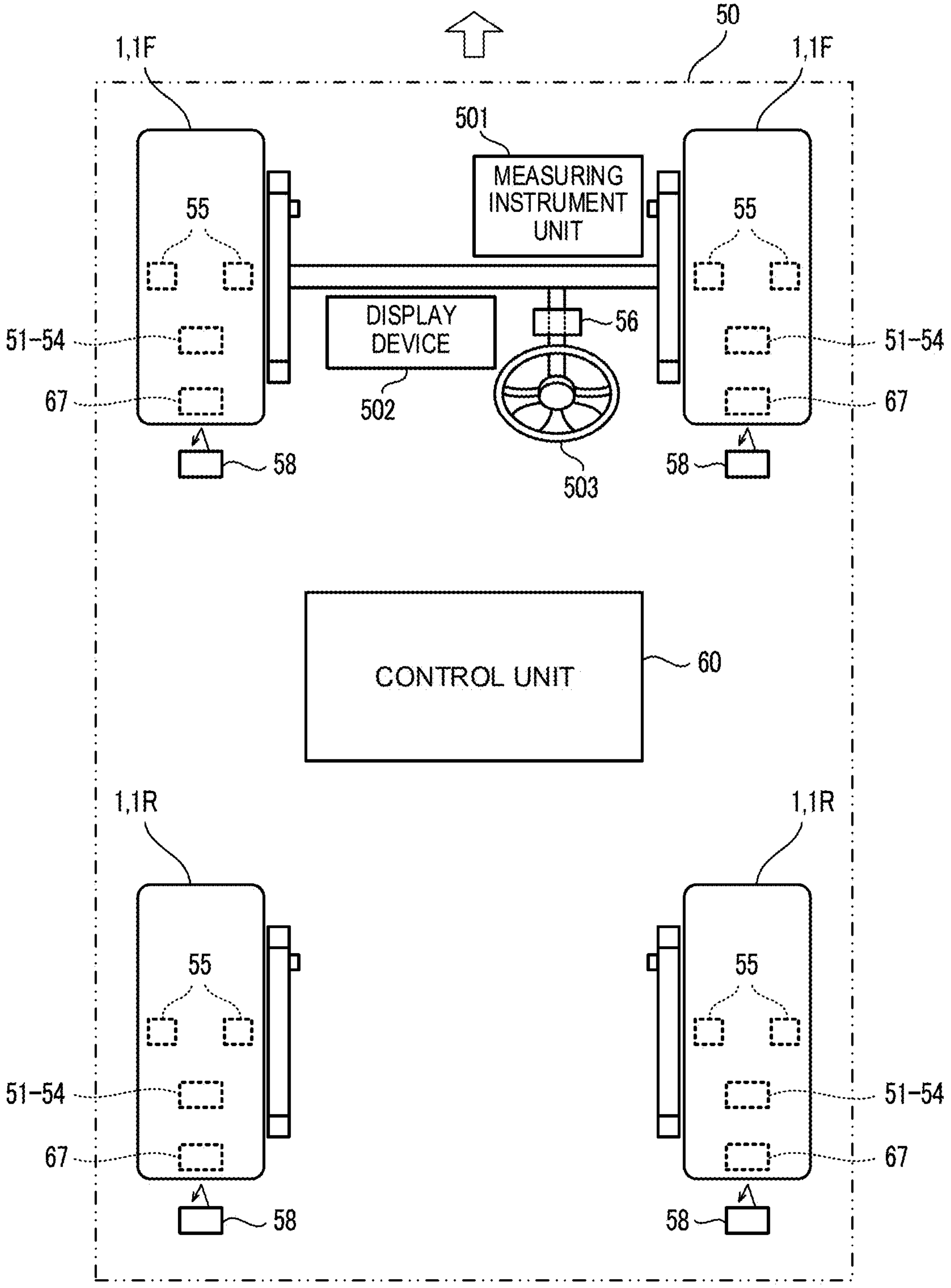
FIG. 2 is a schematic diagram showing an example of a vehicle.
Figure 3:
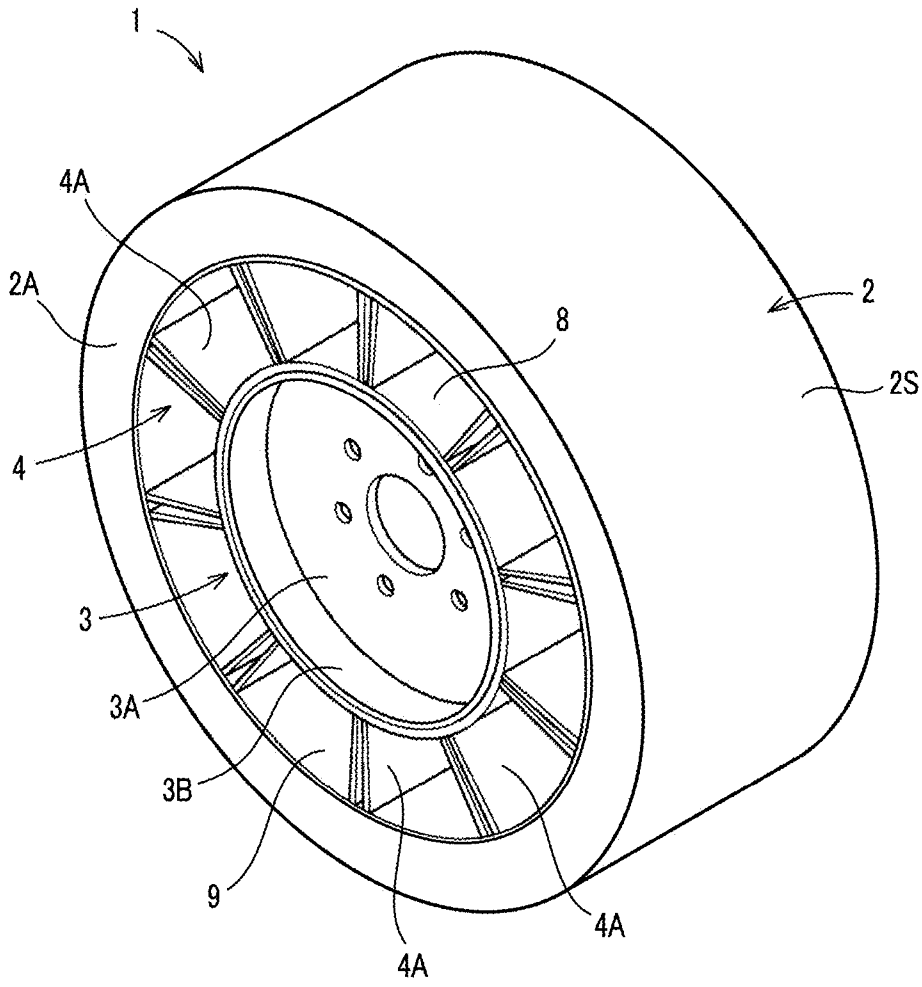
FIG. 3 is a perspective diagram showing a configuration of a tire mounted on the vehicle.
Figure 4:
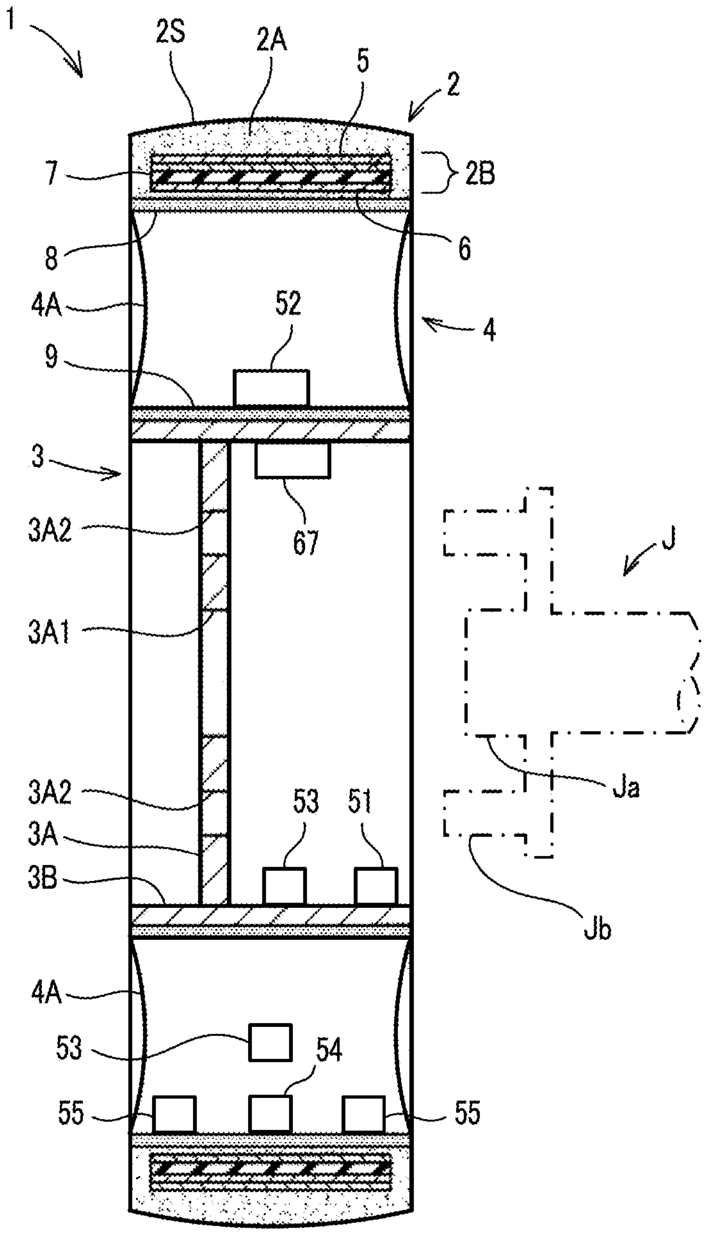
FIG. 4 is a cross-sectional diagram of the tire in the axial direction thereof.
Figure 5:
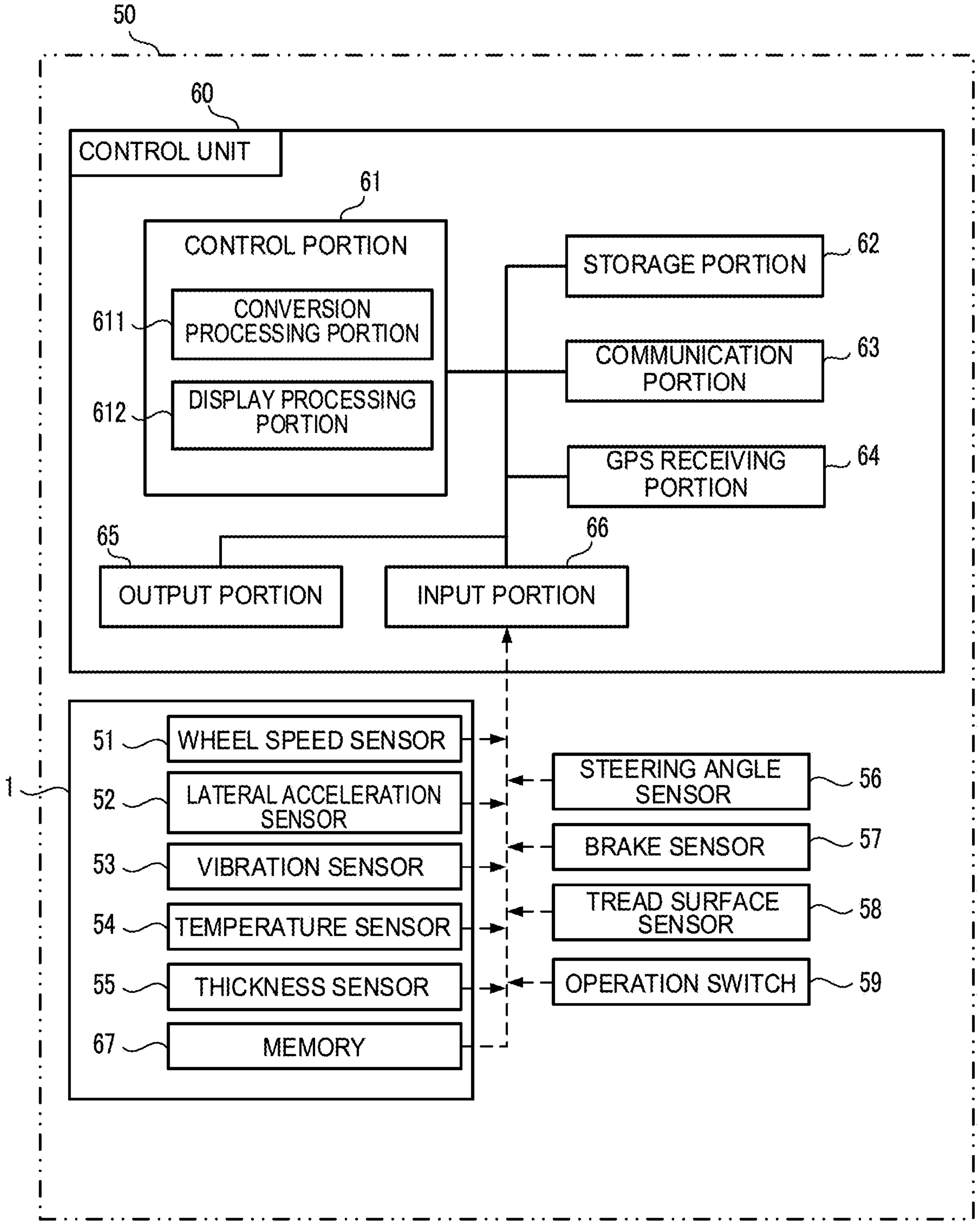
FIG. 5 is a block diagram showing a configuration of the vehicle.

The following describes, with reference to FIG. 2 to FIG. 5, the vehicle 50 on which the tires 1 are mounted. Here, FIG. 2 is a schematic diagram showing an example of the vehicle 50. FIG. 3 is a perspective diagram showing a configuration of the tire 1 mounted on the vehicle 50. FIG. 4 is a cross-sectional diagram of the tire 1 in the axial direction thereof. FIG. 5 is block diagram showing a configuration of the vehicle 50.

As shown in FIG. 2, the vehicle 50 is, for example, a four-wheel passenger car including a total of four wheels at the front and the rear. The tire 1 is mounted to each wheel of the vehicle 50. In the present embodiment, the vehicle 50 is, for example, a front engine-front drive car (FF car). Tires 1F mounted to the front wheels of the vehicle 50 are driving tires, and tires 1R mounted to the rear wheels are driven tires. It is noted that the driving system and the steering system of the vehicle 50 are not particularly limited. For example, the driving system of the vehicle 50 may be different from that of the FF car, and the steering system of the vehicle 50 may be different from the front wheel steering system.

In addition, the vehicle 50 is not limited to the four-wheel passenger car, but may be a passenger car with any number of wheels other than four, a large-sized vehicle such as a truck or a bus, a motorcycle, a racing vehicle, an industrial vehicle, a special vehicle, or a vehicle for loading such as a trailer or a carriage.

The tire 1 is a non-pneumatic tire that can be used in the above-described various types of vehicles. In the present embodiment, as shown in FIG. 3 and FIG. 4, the tire 1 for a passenger car is described as one example. The tire 1 includes: the tread ring 2 (an example of a tread portion of the present disclosure) of a cylindrical shape including a tread surface 2S that touches the road surface on the ground; a hub portion 3 (an example of a hub portion of the present disclosure) disposed inside the tread ring 2 in the radial direction thereof; and a spoke portion 4 (an example of a spoke portion of the present disclosure). It is noted that the radial direction is perpendicular to a rotation axis direction of the tire 1.

The tread ring 2 is a part corresponding to the tread portion of the pneumatic tire, and includes: a tread rubber 2A that forms the tread surface 2S; and a reinforcing cord layer 2B. The reinforcing cord layer 2B is disposed more inside of the tread ring 2 in the radial direction than the tread rubber 2A.

As the tread rubber 2A, a rubber composition that is excellent in frictional force to ground contact and in wear resistance is suitable. For example, the tread rubber 2A is formed from a rubber material that contains, as a main component, a rubber component such as a natural rubber (NR) or SBR (styrene-butadiene rubber). The tread rubber 2A only needs to contain, as a main component, a rubber component that is used in the tire industry, and the rubber component is not particularly limited. In addition, various patterns of tread groove (not shown) are formed on the tread surface 2S being a surface portion of the tread rubber 2A.

The reinforcing cord layer 2B is composed of a plurality of layers and includes: an outer breaker 5 disposed outside in the radial direction; an inner breaker 6 disposed inside in the radial direction; and a shear rubber layer 7, formed from a high elastic rubber, disposed between the outer and inner breakers.

The outer breaker 5 is composed of a plurality of (for example, two) outer plies. The outer plies are each a cord layer in which high elastic reinforcing cords such as steel cords are arranged to align in a state of being slanted at an angle in the range of 5 to 85 degrees, preferably 10 to 35 degrees, with respect to the tire peripheral direction. The reinforcing cords in each outer ply are disposed to cross each other.

The inner breaker 6 is composed of one or more inner plies in which high elastic reinforcing cords such as steel cords are spirally wound in the tire peripheral direction. The shear rubber layer 7 is made of a high elastic rubber whose complex elastic modulus E* is preferably 70 MPa or more, or more preferably 90 MPa or more.

The reinforcing cord layer 2B has a sandwich structure where the shear rubber layer 7 formed from a high elastic rubber is sandwiched by the outer breaker 5 and the inner breaker 6 from both sides in the radial direction. This greatly enhances the rigidity of the tread ring 2, realizing a high rolling performance of the tire 1.

The hub portion 3 corresponds to a tire wheel and is fixed to an axle J (see FIG. 4) of the vehicle 50. The hub portion 3 includes: a disk portion 3A of a disk shape fixed to the axle J; and a cylindrical spoke attachment portion 3B integrally formed with an end portion (outer end portion) of the disk portion 3A located outside in the radial direction. The disk portion 3A has, at its center, a hub hole 3A1 in which a front end portion Ja of the axle J is inserted. In addition, in the disk portion 3A, a plurality of bolt insertion holes 3A2 in which bolt portions Jb of the axle J are inserted, are formed around the hub hole 3A1. The hub portion 3 is, as is the case with the tire wheel, made of a metal material such as steel, aluminum alloy, or magnesium alloy. Of course, the hub portion 3 may be made of a polymer material such as a synthetic resin having rigidity and strength equivalent to those of the above-mentioned metal materials.

The spoke portion 4 couples the tread ring 2 to the hub portion 3, and is, for example, made of a polymer material such as a synthetic resin. The spoke portion 4 is integrally formed with the tread ring 2 and the hub portion 3 by cast molding the polymer material. As the polymer material, a thermoplastic resin, a thermosetting resin or the like is preferable; from the viewpoint of security, a thermosetting resin such as epoxy resin, phenolic resin, urethane resin, silicon resin, polyimide resin, or melamine resin is preferable; and in particular, urethane resin having excellent elasticity is more preferable.

The spoke portion 4 includes: a tread-side annular portion 8 joined with an inner peripheral surface of the tread ring 2; a hub-side annular portion 9 joined with an outer peripheral surface of the hub portion 3; and a plurality of spoke plates 4A extending in the radial direction from the hub-side annular portion 9 to the tread-side annular portion 8. It is noted that the spoke plates 4A are also called blades.

In the present embodiment, as the tire 1 mounted on the vehicle 50, a non-pneumatic tire with the above-described configuration is described as one example. However, the tire 1 is not limited to the above-described configuration as far as it is a non-pneumatic tire whose inside is not filled with air. For example, the tire 1 may not include the spoke portion 4, and a part between the hub portion 3 and the tread ring 2 may be composed of a tread rubber containing a rubber component (rubber material) such as natural rubber (NR) or SBR (styrene-butadiene rubber).

As shown in FIG. 5, the vehicle 50 includes various types of sensors such as a wheel speed sensor 51, a lateral acceleration sensor 52, two vibration sensors 53, a temperature sensor 54, a thickness sensor 55, a steering angle sensor 56, a brake sensor 57, and a tread surface sensor 58. The sensors 51 to 55 are fixed to the hub portion 3, the spoke portion 4 or the like of the tire 1 via a mount member (not shown).

The wheel speed sensor 51 detects a wheel speed signal (rotation speed information) of the tire 1 during travelling. A control portion 61 of the control unit 60 calculates, based on the wheel speed signal received from the wheel speed sensor 51, the number of rotations of the tire 1 (the number of tire rotations), a travel speed of the vehicle 50, and an acceleration of the vehicle 50 in a travelling direction. The control portion 61 stores, as an example of state data showing a state of the vehicle 50 using the tire 1, in a storage portion 62 of the control unit 60: an accumulated number of tire rotations that indicates a cumulative value of the calculated number of tire rotations; a travel speed variation history that indicates a time-series variation of the travel speed; and an acceleration variation history that indicates a time-series variation of the acceleration.

The lateral acceleration sensor 52 is attached to the hub-side annular portion 9. The lateral acceleration sensor 52 detects an acceleration in the lateral direction (lateral-direction acceleration) applied to the tire 1 during travelling. The control portion 61 stores, in the storage portion 62, a lateral acceleration variation history that indicates a time-series variation of the lateral-direction acceleration, as an example of the state data.

It is noted that excessive number of tire rotations, travel speed, acceleration, or lateral-direction acceleration may apply a large load to the tire 1 and thus is considered a cause of deterioration of the tire 1. Accordingly, it can be said that the state data such as the accumulated number of tire rotations, the travel speed variation history, the acceleration variation history, and the lateral acceleration variation history is information (the deterioration-related information of the present disclosure) that exerts influence on deterioration of the tire 1.

As shown in FIG. 4, the vibration sensors 53 are respectively attached to a spoke plate 4A of the spoke portion 4 and the spoke attachment portion 3B of the hub portion 3 of the tire 1. The vibration sensors 53 detect vibrations that occur in the tire 1 during travelling of the vehicle 50. Specifically, they detect vibrations that occur in the spoke plate 4A and the spoke attachment portion 3B. In the present embodiment, the vibration sensors 53 respectively detect vibration values that occur in the spoke plate 4A and the spoke attachment portion 3B when the vehicle 50 travels at a predetermined set speed. The set speed is, for example, a speed in a low speed range (30 to 60 km/h). The control portion 61 stores, in the storage portion 62, vibration values detected by the vibration sensors 53 and an average value (average vibration value) of the vibration values for each predetermined period, as an example of the state data.

An excessively large vibration may apply a large load to the tire 1 and may be a cause of a deterioration of the tire 1. Accordingly, it can be said that the state data such as the vibration value and the average vibration value is information (the deterioration-related information of the present disclosure) that exerts influence on deterioration of the tire 1.

The temperature sensor 54 detects the temperature of the tread ring 2 of the tire 1 (tread temperature) during travelling or stopping. The temperature sensor 54 is provided at the tread-side annular portion 8 of each tire 1, and detects the tread temperature that has been transmitted from the tread ring 2 to the tread-side annular portion 8. The control portion 61 stores, in the storage portion 62, the tread temperature and a tread temperature variation history that indicates a time-series variation of the tread temperature, as the state data. It is noted that the tread temperature variation history may be stored in the storage portion 62 in a state of being divided into a during-travel temperature history acquired during travelling of the vehicle 50 and a during-stop temperature history acquired during stopping of the vehicle 50.

It is noted that a high temperature of the tread ring 2 of the tire 1 may apply a load to the tire 1 and deteriorate the tire 1. Accordingly, it is considered that the high temperature of the tread ring 2 is a cause of degradation of the tire 1. Accordingly, it can be said that the tread temperature and the tread temperature variation history are information (the deterioration-related information of the present disclosure) that exerts influence on deterioration of the tire 1.

The thickness sensor 55 detects a thickness (a thickness from the reinforcing cord layer 2B to the tread surface 2S) of the tread ring 2 of the tire 1. Two thickness sensors 55 are provided on the tread-side annular portion 8 of each tire 1, and are installed with a predetermined interval therebetween in a width direction of the tire 1. The control portion 61 calculates the wear amount (tread wear amount) of the tread rubber 2A by subtracting a current thickness detected by the thickness sensor 55 from an initial thickness of the tread ring 2. In addition, the control portion 61 stores, in the storage portion 62, the tread wear amount and a tread wear history that indicates a change of the tread wear amount over time, as an example of the state data.

It is noted that when the tread rubber 2A of the tire 1 wears, an impact or a load received by the tire 1 from the road surface during travelling increases, and the tire 1 may be deteriorated. Specifically, the impact or the load may cause a crack or a damage in the hub portion 3 or the spoke portion 4. In addition, a crack may occur in the tread ring 2, or the tread ring 2 may burst. Accordingly, it is considered that the wear of the tread rubber 2A is a cause of deterioration of the tire 1. Accordingly, it can be said that the tread wear amount and the tread wear history are information (the deterioration-related information of the present disclosure) that exerts influence on deterioration of the tire 1.

Each of the sensors 51 to 55 is connected to a transmitter (not shown) installed at the tire 1. A detection value of each of the sensors 51 to 55 is transmitted to the control unit 60 via the transmitter. Each of the sensors 51 to 55 may have any configuration as far as it can output a detection value of the detection object or a signal indicating the detection value. In addition, each of the sensors 51 to 55 is not limited to a specific attachment position or detection method as far as it can detect a detection value of the detection object. It is noted that when each of the sensors 51 to 55 is connected to the control unit 60 in such a way as to communicate in a wireless or wired manner, the detection value may be transmitted individually from each of the sensors 51 to 55 to the control unit 60.

The steering angle sensor 56 detects a steering angle that is a rotation angle of a handle 503. For example, the steering angle sensor 56 is installed at a steering shaft of the handle 503. The steering angle sensor 56 is connected to the control unit 60 in such a way as to communicate in a wireless or wired manner, and the steering angle (detection value) detected by the steering angle sensor 56 is transmitted to the control unit 60. The steering angle sensor 56 may have any configuration as far as it can detect the steering angle of the handle 503, and is not limited to a specific attachment position or detection method.

The control portion 61 stores in the storage portion 62 a steering angle history that indicates a time-series variation of the steering angle detected during travelling, as an example of the state data.

The brake sensor 57, when the driver has performed a brake operation, detects whether or not the operation has been performed, and detects a step amount (operation amount). The brake sensor 57 is, for example, a rotary encoder or a potentiometer installed at a brake pedal. The brake sensor 57 is connected to the control unit 60 in such a way as to communicate in a wireless or wired manner, and presence or absence (detection value) of the operation and the step amount (detection value) detected by the brake sensor 57 are transmitted to the control unit 60. The brake sensor 57 may have any configuration as far as it can detect the detection value concerning the brake operation, and is not limited to a specific attachment position or detection method.

The control portion 61 stores, in the storage portion 62, the number of times of brake operation and a step amount history as an example of the state data, wherein the number of times of brake operation indicates a cumulative number of times of brake operation during travelling, and the step amount history indicates a history of the step amount for each brake operation.

It is noted that the steering angle of the handle 503, the number of times of brake operation, and the step amount affect the friction between the tire 1 mounted on the vehicle 50 and the road surface. Accordingly, it can be said that the steering angle, the number of times of brake operation, the step amount, and the step amount history are information (the deterioration-related information of the present disclosure) that exerts influence on deterioration of the tire 1.

The tread surface sensor 58 detects presence or absence of the tread groove on the tread surface 2S of the tread ring 2 of the tire 1, and detects information for measuring the tread groove depth. The tread surface sensor 58 may be, for example, a scanning type optical distance sensor installed at an inner surface of a tire house (not shown) of the vehicle 50. The optical distance sensor emits a laser beam to the tread surface 2S to scan in the tire width direction, and measures the distance to the tread surface 2S that is the detection object by receiving a reflection light reflected on the tread surface 2S. In addition, the optical distance sensor generates and outputs trace data obtained by tracing the uneven shape of the tread surface 2S in the width direction. This allows the control portion 61 of the control unit 60 to determine presence or absence of the tread groove on the tread surface 2S and measure the tread groove depth based on the trace data. It is noted that a plurality of reflection type photo interrupters (also called photo reflectors) arranged on the inner surface of the tire house along the width direction may be applied instead of the optical distance sensor. In addition, a camera for picking up an image of the tread surface 2S or a line sensor for detecting a shape in the tire width direction may be applied instead of the optical distance sensor.

The control portion 61 stores in the storage portion 62 a tread groove history that indicates a groove depth of the tread groove and a change of the groove depth over time, as an example of the state data.

It is noted that the groove depth of the tread groove of the tread surface 2S affects the braking performance and the drainage performance, and thus it can be said that the groove depth of the tread groove is information (the deterioration-related information of the present disclosure) that exerts influence on deterioration of the tire 1.

In addition, the vehicle 50 includes an operation switch 59. The operation switch 59 is a switch member operated by a driver or the like, and when the operation switch 59 is operated, an operation signal thereof is transmitted to the control unit 60.

In addition, the tire 1 includes a memory 67 (an example of a storage portion) in which identification information of the tire 1 (tire identification information) is stored. The memory 67 is a nonvolatile storage device. The memory 67 is, for example, fixed to the hub portion 3, the spoke portion 4 or the like of the tire 1 via a predetermined mount member (not shown). The identification information only needs to be able to distinguish the tire 1 from other tires, and is an ID number assigned to each of the tires. In addition, the identification information may include a size, a maker name, a model number, a product name, and a manufacturing year/month/day of the tire 1. When the tire 1 is mounted on the vehicle 50, the identification information is transmitted to the control unit 60 and the identification information is stored in the storage portion 62.

When the key switch of the vehicle 50 is turned on in a state where the tire 1 is mounted on the vehicle 50, the tire identification information in the memory 67 is transmitted to the control unit 60, and is stored in the storage portion 62 of the control unit 60.

As shown in FIG. 5, the vehicle 50 includes the control unit 60 that comprehensively controls the vehicle 50. The control unit 60 is an information processing apparatus configured to execute various calculation processes. The control unit 60 includes the control portion 61, the storage portion 62, the communication portion 63, a GPS receiving portion 64 (an example of a position information acquisition portion of the present disclosure), an output portion 65, and an input portion 66.

The communication portion 63 is a communication interface for wirelessly connecting the control unit 60 to a predetermined communication network and executing a data communication with an external apparatus such as the communication apparatus 40 via the communication network according to a predetermined communication protocol.

The GPS receiving portion 64 acquires position information (vehicle position information) indicating a position of the vehicle 50. The GPS receiving portion 64 detects the position of the vehicle 50 on ground by receiving a signal from a GPS satellite and performing a predetermined calculation process. The detected position information is transmitted to the control portion 61 to be used in the calculation processes such as a process to identify the travel position of the vehicle 50 and a process to identify the travel route of the vehicle 50.

In the present embodiment, the travel route of the vehicle 50 is identified by the control portion 61 based on the vehicle position information identified during stopping or travelling of the vehicle 50. In addition, the travel distance of the vehicle 50 is calculated by the control portion 61 based on the vehicle position information. The control portion 61 stores the vehicle position information in the storage portion 62 as an example of the state data. In addition, the control portion 61 stores travel route information and travel distance information in the storage portion 62 as an example of the state data, wherein the travel route information indicates the travel route, and the travel distance information indicates the travel distance.

It is noted that an environment around the stop or travel position of the vehicle 50, the state of a road surface on which the vehicle 50 travels, and the travel distance of the vehicle may be causes of deterioration of the tire 1. For example, when the environment is inferior, when the vehicle 50 is travelling on a rough road surface, or when the travel distance is excessively long, an excessive load is applied to the tread ring 2, the hub portion 3, the spoke portion 4 or the like of tire 1, and the tire 1 may be deteriorated. Accordingly, the vehicle position information, the travel route information, and the travel distance information are information (the deterioration-related information) that exerts influence on deterioration of the tire 1.

The storage portion 62 is a nonvolatile storage medium or storage device, such as a flash memory, for storing various types of information. For example, the storage portion 62 stores a control program for causing the control portion 61 to execute various processes. The control program had been stored in an external storage apparatus, such as a server apparatus or an external storage, that can be communicably connected to the communication portion 63, and was read from the external storage apparatus and copied into the storage portion 62. Alternatively, the control program may have been recorded in a non-transitory manner in a computer-readable recording medium such as a CD or a DVD, and may have been read therefrom by a reader (not shown) electrically connected with the control unit 60 and copied into the storage portion 62.

In addition, the storage portion 62 stores detection values and data transmitted from each of the sensors 51 to 58, detection values and data detected by the GPS receiving portion 64, and the like. In addition, the storage portion 62 stores the above-mentioned various types of state data (the accumulated number of tire rotations, the travel speed variation history, the acceleration variation history, the lateral acceleration variation history, the vibration value, the average vibration value, the tread temperature variation history, the tread wear history, the steering angle history, the number of times of brake operation, the step amount history, and the tread groove history). In addition, the storage portion 62 stores the vehicle position information, the travel route information, the travel distance information and the like.

The output portion 65 is an interface that outputs, in a wireless or wired manner, results of various processes executed by the control portion 61, data in the storage portion 62, and the like. For example, a measuring instrument unit 501 and a display device 502 loaded in the vehicle 50 are connected to the output portion 65. In addition, the memory 67 installed in the tire 1 is connected in a wireless or wired manner to the output portion 65. For example, the control portion 61 outputs the speed information or the like to the measuring instrument unit 501 via the output portion 65. In addition, the control portion 61 outputs various types of information in response to display requests from the driver or the like, determination results of the abnormality determination process (see FIG. 7) described below, and the like, to the display device 502 via the output portion 65. In addition, the control portion 61 transfers the state data in the storage portion 62 to the memory 67 via the output portion 65.

The input portion 66 is an interface that is connected in a wireless or wired manner to the various sensors 51 to 58, the operation switch 59, the memory 67 and the like installed in the vehicle 50. Signals output from the various sensors 51 to 58, the operation switch 59 and the like, data read from the memory 67 and the like are input to the input portion 66.

The control portion 61 includes control equipment such as a CPU, a ROM, and a RAM. The CPU is a processor that executes various types of arithmetic processing. The ROM is a nonvolatile memory in which control programs, such as BIOS and OS, for causing the CPU to execute various processes are preliminarily stored. The RAM is a volatile or nonvolatile memory for storing various types of information and is used as a temporary storage memory (working area) for the various processes executed by the CPU. The control portion 61 executes various processes described below by causing the CPU to execute the various control programs preliminarily stored in the ROM or the storage portion 42.

The control portion 61 includes various processing portions such as a conversion processing portion 611 and a display processing portion 612. The control portion 61 functions as the various processing portions when the CPU executes various processes in accordance with the control programs. It is noted that a part or all of the processing portions included in the control portion 61 may be composed of an electronic circuit. In addition, processes described below executed by the conversion processing portion 611 may be executed by different processing portions. In addition, the control program may be a program for causing a plurality of processors to function as the various processing portions.

The conversion processing portion 611 performs a process to convert detection values and data that have been input to the input portion 66 from the various sensors 51 to 58, to the state data related to the detection values and the data. In addition, the conversion processing portion 611 performs a process to generate the state data related to the detection values and the data based on the detection values and the data.

Here, the state data is an example of the deterioration-related information of the present disclosure, and includes, for example, the number of rotations of the tire 1 (the number of tire rotations), the travel speed of the vehicle 50, the acceleration of the vehicle 50, the lateral-direction acceleration applied to the tire 1, the temperature of the tread ring 2 of the tire 1 (tread temperature), the tread groove depth on the tread surface 2S of the tire 1, the wear amount of the tread ring 2 of the tire 1 (tread wear amount), the uneven wear amount of the tread ring 2, the steering angle of the vehicle 50, the number of times of brake operation, the brake step amount, the vibration value that occurs in the tire 1 (for example, in the spoke plates 4A and the spoke attachment portion 3B) during travelling of the vehicle 50, and the average vibration value. In addition, the state data includes an average value, a maximum value, a minimum value or the like of each of these elements. In addition, with regard to the number of tire rotations and the number of times of brake operation, the number of rotations or times per prescribed travel distance may be included in the state data. These pieces of state data are information about causes that may directly or indirectly exert influence on the deterioration of the tire 1 during travelling of the vehicle 50.

The number of tire rotations, the travel speed, and the acceleration can be obtained by conversion or generated based on the detection value (wheel speed signal) of the wheel speed sensor 51. The lateral-direction acceleration can be obtained by conversion or generated based on the detection value of the lateral acceleration sensor 52. The vibration value of the tire 1 can be obtained by conversion or generated based on the detection value of the vibration sensors 53. The tread temperature can be obtained by conversion or generated based on the detection value of the temperature sensor 54.

The tread groove depth on the tread surface 2S can be obtained by conversion or generated based on the data output from the tread surface sensor 58.

The tread wear amount can be obtained by conversion or generated based on the detection value of the thickness sensor 55. The uneven wear amount indicates a degree of uneven wear of the tread ring 2 of the tire 1. A specific example of the uneven wear amount is a difference in thickness between opposite ends of the tread ring 2 in the width direction, and it can be obtained by conversion or generated based on a difference between detection values obtained by a pair of thickness sensors 55 installed on the inner space surface of the tire 1 separate from each other in the width direction.

It is noted that the uneven wear that occurs on the tread ring 2 of the tire 1 includes what is called an unsymmetric wear (outer wear, inner wear), a both-shoulder wear, a center wear, a toe-in wear, a toe-out wear, a local wear, a corrugated wear, a pitted wear, and a sawtooth wear (heel and toe wear). Presence or absence of any of these uneven wears or a degree of the uneven wear (uneven wear amount) can be determined or measured by adjusting the number of thickness sensors 55 disposed to be attached to the tire 1 or the disposal positions thereof as appropriate.

The steering angle can be obtained by conversion or generated based on the detection value of the steering angle sensor 56. The number of times of braking and the brake step amount can be obtained by conversion or generated based on the detection value of the brake sensor 57.

The state data including the above-described various types of information obtained by the conversion processing portion 611 is stored in the storage portion 62 for each piece of identification information of the tire 1. In addition, the state data stored in the storage portion 62 is transferred to the memory 67 of each tire 1 via the output portion 65 and stored in the memory 67, for example, at a timing when the vehicle 50 stops and key-off is performed. With this configuration, even when the tire 1 is removed from the vehicle 50 and mounted on another vehicle 50 as a used tire, the state data of the tire 1 can be handed over to the other vehicle 50.

These pieces of information (state data) stored in the storage portion 62 are information about causes that may exert influence on the deterioration of the tire 1. For example, it is considered that the higher the numerical values of the above-mentioned pieces of information (the number of tire rotations, the travel speed, the acceleration, the lateral acceleration, the vibration value, the average vibration value, the tread temperature, the tread wear amount, and the like) are, the larger the load applied to the tire 1 is, promoting the deterioration or the wear of each portion of the tire 1. On the contrary, it is considered that the lower the numerical values of the above-mentioned pieces of information are, the smaller the load applied to the tire 1 is, each portion of the tire 1 hardly deteriorating and hardly wearing. These pieces of state data are used in the abnormality determination process (see FIG. 7) described below.

It is noted that the tread temperature tends to increase when a heavy travel load is applied to the tire, such as when the vehicle 50 is travelling on a highway or a road with many curves. In addition, the tread temperature tends to be higher when a damage such as a crack or a peeling-off has occurred on an inner portion of the tread ring 2 that is difficult to be visually observed from outside, than when such damage has not occurred. It is considered that this is because when the tread surface 2S of the tire 1 touches the road surface on the ground with a damage in the inner portion of the tread surface 2S, the tread ring 2 or the spoke portion 4 of the tire 1 is excessively deformed, and repetition of the deformation and restoration to the state of not touching the ground causes the temperature of the tread ring 2 to be higher than usual.

In addition, the conversion processing portion 611 performs, based on the vehicle position information of the vehicle 50 input from the GPS receiving portion 64 to the input portion 66, a process to generate a travel route of the vehicle 50 from the vehicle position information, and a process to calculate the travel distance for each type of travel route. The travel route is included in the state data. For example, information of the travel route may be a travel distance for each type of travel route. Specifically, as the information of the travel route, a distance of a flat road travelled (flat road travel distance), a distance of a mountain road travelled (mountain road travel distance), a distance of an urban area travelled (urban area travel distance), a distance of a highway travelled (highway travel distance), and the like are accumulatively stored in the storage portion 62. These pieces of information, too, are information (the deterioration-related information) about causes that may exert influence on the deterioration of the tire 1. That is, it is considered that the higher the ratio of the mountain road travel distance and the highway travel distance to the total travel distance travelled by the tire 1 is, the larger the load applied to the tire 1 is, promoting the deterioration or wear of each portion of the tire 1. On the contrary, it is considered that the higher the ratio of the flat road travel distance and the urban area travel distance is, the smaller the load applied to the tire 1 is, each portion of the tire 1 hardly deteriorating and hardly wearing. These pieces of information of the travel distance are used in the abnormality determination process (see FIG. 7) described below. It is noted that the flat road, the mountain road, the road in the urban area, and the highway are an example of the type of travel route described above.

The display processing portion 612 performs a process to display various types of information on the display device 502. For example, upon receiving a result of the abnormality determination process described below (determination result) transmitted from the abnormality determination apparatus 10, the display processing portion 612 displays the determination result on the display screen of the display device 502.

Database 30

The database 30 has storage areas assigned to a state data storage portion 31 and a business office data storage portion 32.

The state data storage portion 31 stores the state data acquired by the abnormality determination apparatus 10 from the vehicle 50, in a state of being divided for each piece of identification information of the tires 1. A piece of identification information is assigned to each tire 1 and the state data is stored in the state data storage portion 31 for each piece of identification information. For this reason, even when the tire 1 is removed from the vehicle 50 and mounted on another vehicle 50 as a used tire, the state data can be handed over, and the state data can be updated to information or data that is newly detected in the other vehicle 50.

The business office data storage portion 32 stores business office data (an example of a business office position data of the present disclosure) including business office position information that is used in the abnormality determination process (see FIG. 7) described below. The business office position information is information indicating a position of the repair business office where a repair or maintenance of the vehicles 50 and a repair work such as a repair or replacement of the tire 1 are available. For example, the business office position information includes a name, location information (address), contact destination (telephone number or e-mail address) or the like of a predetermined repair business office. The business office data includes the business office position information of a plurality of repair business offices.

Abnormality Determination Apparatus 10

Figure 6:
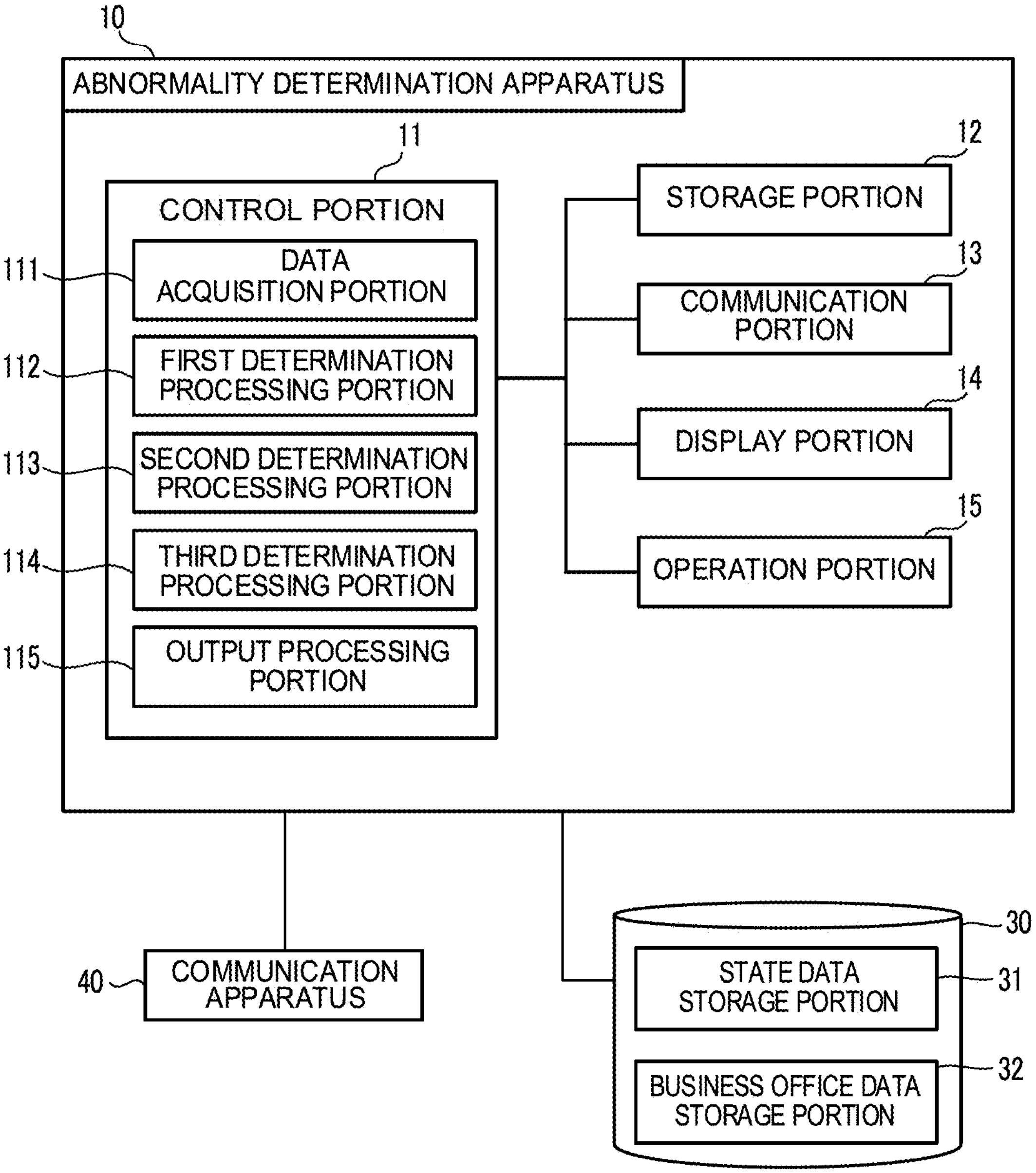
FIG. 6 is a block diagram showing a configuration of an abnormality determination apparatus included in the tire abnormality determination system.

The following describes a specific configuration of the abnormality determination apparatus 10 with reference to FIG. 6. FIG. 6 is a block diagram showing the configuration of the abnormality determination apparatus 10.

The abnormality determination apparatus 10 is for realizing the determination system 100 of the present embodiment, and as shown in FIG. 6, includes a control portion 11, a storage portion 12, a communication portion 13, a display portion 14, and an operation portion 15.

The communication portion 13 is a communication interface for connecting the abnormality determination apparatus 10 to a predetermined network (communication network) in a wireless or wired manner and executing a data communication with each device connected to the network according to a predetermined communication protocol. Specifically, the communication portion 13 executes a data communication with the communication apparatus 40 and the database portion 30 via the network.

The storage portion 12 is a nonvolatile storage device such as a semiconductor memory, an HDD, or an SSD for storing various types of information and data. Although the present embodiment describes, as one example, a configuration where the storage portion 12 is provided in the abnormality determination apparatus 10, for example, a part or all of the various types of information and data in the storage portion 12 may be stored in an external apparatus such as another server apparatus or storage device that can perform a data communication with the abnormality determination apparatus 10 via the network or the Internet. In this case, the abnormality determination apparatus 10, as necessary, reads necessary information from the external apparatus or stores information in the external apparatus.

The storage portion 12 stores a control program for causing the control portion 11 to execute various control processes, the abnormality determination process shown in FIG. 7 described below, and the like. The control program had been stored in an external storage apparatus, such as a server apparatus or an external storage, that can be communicably connected to the communication portion 13, and was read from the external storage apparatus and stored (copied) into the storage portion 12. Alternatively, the control program may have been recorded in a non-transitory manner in a computer-readable recording medium such as a CD or a DVD, and may have been read therefrom by a reader (not shown) electrically connected with the abnormality determination apparatus 10 and stored (copied) into the storage portion 12.

In addition, the storage portion 12 stores the business office position information that is used in the abnormality determination process (see FIG. 7) described below. Here, the business office position information is information indicating a position of the repair business office for performing a repair or maintenance of the vehicles 50, and a repair work such as replacement of the tire 1. For example, the storage portion 12 stores, as the business office position information, table data that includes names, location information (addresses), contact destinations (telephone numbers or e-mail addresses) or the like of a plurality of predetermined repair business offices.

In addition, the storage portion 12 stores a calculation formula described below for calculating an evaluation value used in the abnormality determination process described below.

The evaluation value is an index used to determine presence or absence of a sign of an abnormality in the tire 1, and is an index used to determine presence or absence of an abnormality in the tire 1. In other words, the evaluation value is an index used to determine whether or not the tire 1 is in a normal state where the tire 1 can travel, whether or not the tire 1 is in a state where the tire 1 can travel, but there is a high possibility that an abnormality will occur, and whether or not the tire 1 is in an abnormal state where it is dangerous for the tire 1 to travel. The evaluation value is defined based on the state data.

For example, when S denotes the evaluation value, $x_1$ denotes the number of tire rotations, $x_2$ denotes an average speed of the travel speed, $x_3$ denotes the number of times of occurrence of excessive acceleration, $x_4$ denotes the number of times of occurrence of excessive lateral direction acceleration, $x_5$ denotes the vibration value, $x_6$ denotes an average temperature of the tread temperature, $x_7$ denotes the tread wear amount, $x_8$ denotes the uneven wear amount, $x_9$ denotes the number of times of occurrence of excessive steering angle, $x_{10}$ denotes the number of times of brake operation, and $x_{11}$ denotes the number of times of occurrence of excessive step amount, the evaluation value S is calculated based on the following formula (1) using the above-mentioned numerical values of the state data. Here, the excessive acceleration is an acceleration exceeding a predetermined threshold (predetermined value). In addition, the excessive lateral direction acceleration is an excessive lateral direction acceleration exceeding a predetermined threshold (predetermined value). The excessive steering angle is an excessive steering angle exceeding a predetermined threshold (predetermined angle). The excessive step amount is an excessive step amount exceeding a predetermined threshold (predetermined amount).

[Math 1]

$$S = h\sum_{k=1}^{11} t_k x_k \quad (1)$$

Here, the coefficient $t_k$ ($t_1$, $t_2$, $t_3$, . . . , $t_{11}$) in the formula (1) is a weight coefficient assigned to each numerical value $x_k$ ($x_1$, $x_2$, $x_3$, . . . , $x_{11}$) of the state data, and is a coefficient that is determined based on which of each numerical value $x_k$ is emphasized. In addition, the coefficient h is a weight coefficient that is applied in correspondence with the travel route travelled with the tire 1. For example, when the ratio of the mountain road travel distance and the highway travel distance to the total travel distance is higher than a reference distance, the coefficient h is set to a numerical value larger than 1 (one) that is determined in correspondence with a difference (excessive amount) from the reference distance. When the coefficient h is applied, the evaluation value S is larger than when the coefficient h is not applied. In addition, when the ratio of the flat road travel distance and the urban area travel distance to the total travel distance is higher than the reference value, the coefficient h is set to a numerical value smaller than 1 (one) that is determined in correspondence with a difference (excessive amount) from the reference distance. In this case, the evaluation value S is smaller than when the coefficient h is not applied. It is noted that when the ratio of the mountain road travel distance and the highway travel distance is lower than the reference distance and the ratio of the flat road travel distance and the urban area travel distance is lower than the reference distance, the coefficient h is set to 1 (one).

As understood from the above-described formula, the evaluation value S is the sum total of the numerical value $t_k x_k$. It is accordingly considered that the larger $$S = h\sum_{k=1}^{11} t_k x_k \quad (1)$$

the evaluation value S is, the larger the damage of the tire 1 is, and there is a higher possibility that a peeling-off, a crack, or a damage has occurred in the tire 1. In addition, it is considered that the smaller the evaluation value S is, the smaller the damage of the tire 1 is, and there is a lower possibility that a peeling-off, a crack, or a damage has occurred in the tire 1. That is, the evaluation value S is an index indicating the degree of the state of the tire 1, a lower numerical value of the evaluation value S indicates a better (normal) state where the deterioration of the base body portion has not progressed, and a higher numerical value of the evaluation value S indicates an abnormal state where the deterioration has progressed and a peeling-off, a crack, or a damage has occurred in the tire 1.

In the present embodiment, as thresholds for determining the state of the tire 1, a first threshold (an example of a first reference value of the present disclosure) and a second threshold (an example of a second reference value of the present disclosure) are used. The thresholds are stored in the storage portion 12. For example, when the evaluation value S is lower than the first threshold, the control portion 11 determines that the tire 1 is normal. In addition, when the evaluation value S is equal to or higher than the first threshold and lower than the second threshold, the control portion 11 determines that the tire 1 is not abnormal, but a sign of an abnormality that is one step before the abnormality has occurred. In addition, when the evaluation value S is equal to or higher than the second threshold, the control portion 11 determines that the tire 1 is in the abnormal state where it is dangerous for the tire 1 to travel.

It is noted that when the tire 1 is abnormal, it means that the tire 1 is in the abnormal state where a peeling-off, a crack, or a damage has occurred. In addition, the sign of an abnormality is a phenomenon that appears when the tire 1 is in a cautious state before reaching the abnormal state. In the present embodiment, the sign of an abnormality is explicitly indicated by the numerical value of the evaluation value S. Thus, in the present embodiment, when the evaluation value S is equal to or higher than the second threshold, it is evaluated that a peeling-off, a crack, or a damage has occurred in the tire 1. In addition, when the evaluation value S is equal to or higher than the first threshold and lower than the second threshold, the numerical values of the evaluation value S in the range are each evaluated as the sign of an abnormality of the tire 1.

It is noted that indices indicating, for example, a use period, an elapsed time from the manufacturing, and a state of the environment in which the vehicle 50 is used, may be used for defining the evaluation value S.

The display portion 14 is a display device for displaying various types of information, such as a liquid crystal display, an organic EL display, or a touch panel enabling direct touch inputs to the screen. The operation portion 15 is an input device for receiving an operation of an operator, such as a mouse, a keyboard, or a touch panel.

The control portion 11 controls the operation of each portion of the abnormality determination apparatus 10. The control portion 11 includes control equipment such as a CPU, a ROM, and a RAM. The CPU is a processor that executes various types of arithmetic processing. The ROM is a nonvolatile storage medium in which control programs, such as BIOS and OS, for causing the CPU to execute various types of arithmetic processing are preliminarily stored. The RAM is a volatile or nonvolatile storage medium for storing various types of information and is used as a temporary storage memory (working area) for the various types of arithmetic processing executed by the CPU. The control portion 11 controls the abnormality determination apparatus 10 by causing the CPU to execute the various control programs preliminarily stored in the ROM or the storage portion 12.

As shown in FIG. 6, the control portion 11 includes various processing portions including: a data acquisition portion 111, a first determination processing portion 112 (an example of a first determination processing portion of the present disclosure); a second determination processing portion 113 (an example of a second determination processing portion of the present disclosure); a third determination processing portion 114 (an example of a third determination processing portion of the present disclosure); and an output processing portion 115 (an example of an output processing portion of the present disclosure). The control portion 11 functions as the above-described various processing portions when the CPU executes various types of arithmetic processing in accordance with the control programs. The control portion 11 or the CPU is an example of a computer or a processor that executes the control programs. It is noted that a part or all of the processing portions included in the control portion 11 may be composed of an electronic circuit. In addition, the control programs may be programs for causing a plurality of processors to function as the various processing portions.

The data acquisition portion 111 is an example of a related information acquisition portion of the present disclosure. When the data acquisition portion 111 operates as the related information acquisition portion, the data acquisition portion 111 performs a process to acquire the state data that may exert influence on the deterioration of the tire 1. Specifically, when a communication between the communication apparatus 40 and the vehicle 50 is established, the data acquisition portion 111 performs the process to acquire the state data from the vehicle 50. In addition, the data acquisition portion 111 performs a process to acquire the identification information of the tire 1 from the vehicle 50. In the present embodiment, the data acquisition portion 111 transmits a data acquisition request to the vehicle 50. Upon receiving the data acquisition request, the control portion 61 of the vehicle 50, in response to the data acquisition request, reads the identification information and state data corresponding to the identification information from the storage portion 62, and transmits them to the abnormality determination apparatus 10.

The data acquisition portion 111 is an example of a vehicle position information acquisition portion of the present disclosure. When the data acquisition portion 111 operates as the vehicle position information acquisition portion, the data acquisition portion 111 performs a process to acquire, via the communication apparatus 40, position information of the vehicle 50 at the current point in time acquired by the GPS receiving portion 64 (see FIG. 5) of the vehicle 50. In the present embodiment, the data acquisition portion 111 transmits a vehicle position acquisition request to the vehicle 50. Upon receiving the vehicle position acquisition request, the control portion 61 of the vehicle 50 transmits the vehicle position information output from the GPS receiving portion 64 to the abnormality determination apparatus 10.

The first determination processing portion 112 performs a process to determine presence or absence of a sign of an abnormality in the tire 1, or a process to determine presence or absence of an abnormality in the tire 1, based on the state data acquired by the data acquisition portion 111.

Specifically, the first determination processing portion 112 calculates, using the state data, the evaluation value S of the tire 1 that is the determination object. Specifically, the first determination processing portion 112 calculates the evaluation value S by applying each numerical value $x_k$ included in the state data and predefined coefficients h and $t_k$ to the calculation formula indicated by the formula (1). Subsequently, when the evaluation value S is lower than the first threshold, the first determination processing portion 112 determines that the tire 1 is normal. In addition, when the evaluation value S is equal to or higher than the first threshold and lower than the second threshold, the first determination processing portion 112 determines that the tire 1 is not abnormal, but a sign of an abnormality that is one step before the abnormality has occurred. In addition, when the evaluation value S is equal to or higher than the second threshold, the first determination processing portion 112 determines that the tire 1 is in the abnormal state where it is dangerous for the tire 1 to travel.

It is noted that the first threshold can be defined based on the maximum value of numerical values of the evaluation values S of a plurality of tires 1 that have been determined as normal by an inspector in a conventional tire inspection. In addition, the second threshold can be defined based on the maximum value of numerical values of the evaluation values S of a plurality of tires 1 for which the inspector has determined that a sign of an abnormality has occurred.

It is noted that although the present embodiment describes an example case where the first determination processing portion 112 determines presence or absence of a sign of an abnormality or presence or absence of an abnormality by using the evaluation value S, the first determination processing portion 112 may determine presence or absence of a sign of an abnormality or presence or absence of an abnormality by using, for example, at least one numerical value of each numerical value $x_k$ of the state data.

For example, when a crack has occurred in the hub portion 3 or the spoke portion 4 of the tire 1, or when the tread ring 2 has peeled off from the spoke portion 4, the vibration value $x_5$ is excessively large. For this reason, the first determination processing portion 112 may determine that the tire 1 is normal when the vibration value $x_5$ is lower than the first threshold. In addition, when the vibration value $x_5$ is equal to or higher than the first threshold and lower than the second threshold, the first determination processing portion 112 may determine that the tire 1 is in a state where a sign of an abnormality has occurred. In addition, when the vibration value $x_5$ is equal to or higher than the second threshold, the first determination processing portion 112 may determine that the tire 1 is in the abnormal state where it is dangerous for the tire 1 to travel.

The second determination processing portion 113, upon a determination by the first determination processing portion 112 that a sign of an abnormality or an abnormality is present, performs a process to determine at least one or more of a travelable time, a travelable distance, and a speed limit that are described below. The travelable time is a time that is required until the tire 1 becomes a disabled state in which the tire 1 cannot travel due to the abnormality. The travelable distance is a distance that can be travelled until the tire 1 becomes the disabled state. The speed limit is a speed at which the tire 1 can travel safely. Here, the disabled state is a state where the tread ring 2 of the tire 1 has completely peeled off, or a state where the hub portion 3 or the spoke portion 4 has been damaged and the tire 1 cannot roll.

For example, in a case where a third threshold higher than the second threshold is preliminarily defined as corresponding to the disabled state, the second determination processing portion 113 can calculate a difference value between the evaluation value S calculated by the first determination processing portion 112 and the third threshold, and calculate the travelable time from an increase tendency of the evaluation value S per unit period and the difference value. It is noted that the increase tendency can be obtained by calculating the evaluation value S at least two times at shifted timings.

In addition, the second determination processing portion 113 can calculate the travelable distance by multiplying the travelable time by the average speed $x_2$.

In addition, in a case where a speed limit correspondence table in which the evaluation values S and speed limits are preliminarily associated with each other is preliminarily defined, the second determination processing portion 113 can obtain the speed limit by extracting, from the speed limit correspondence table, a speed limit associated with the evaluation value S calculated by the first determination processing portion 112.

It is noted that as the third threshold, a value obtained by multiplying the second threshold by a predetermined coefficient (>1.0) may be adopted.

The third determination processing portion 114 determines whether or not a predetermined repair business office is included in the business office data of the business office data storage portion 32, based on the determination result by the second determination processing portion 113 and the vehicle position information acquired by the data acquisition portion 111. The predetermined repair business office is a repair business office located at a position that can be reached by the vehicle 50 mounted with the tire 1 that has been determined as having a sign of an abnormality or an abnormality.

For example, the third determination processing portion 114 extracts, from the business office data, a repair business office that is located in a range of the travelable distance from the current position of the vehicle 50. Since the business office data contains location information (address) of each business office, the third determination processing portion 114 obtains a route length of a travel route from the current position of the vehicle 50 to the location position identified by the location information, and determines whether or not there is a repair business office whose route length is shorter than the travelable distance. When there is a repair business office that satisfies the condition, the third determination processing portion 114 extracts, from the business office data, a piece of business office information that contains the name, position, contact destination or the like of the business office.

In addition, the third determination processing portion 114 extracts, from the business office data, a repair business office that can be reached in the travelable time by the vehicle 50 from the current position. For example, the third determination processing portion 114 obtains, from the route length of the travel route and the average speed of the vehicle 50, a required time for reaching, and determines whether or not there is a repair business office for which the required time is shorter than the travelable time. When there is a repair business office that satisfies the condition, the third determination processing portion 114 extracts, from the business office data, a piece of business office information that contains the name, position, contact destination or the like of the business office.

The output processing portion 115 performs a process to output results of various processes executed in the determination system 100. In the present embodiment, the output processing portion 115 performs a process to output a determination result (a first determination result) of the first determination processing portion 112, a determination result (a second determination result) of the second determination processing portion 113, and a determination result (a third determination result) of the third determination processing portion 114.

The first determination result includes information indicating presence or absence of a sign of an abnormality or information indicating presence or absence of an abnormality. The second determination result is one or more of the travelable time, the travelable distance, and the speed limit. The third determination result includes information indicating presence or absence of a repair business office satisfying the above-mentioned condition. In addition, when there is a repair business office determined as being able to be reached by the vehicle 50 mounted with the tire 1 in which an abnormality or the like has occurred, the third determination result includes the business office information indicating the name, location or the like of the business office.

In the present embodiment, the output processing portion 115 performs a process to output each determination result to the vehicle 50 and display information included in the repair agent information on the display screen of the display device 502 of the vehicle 50. In addition, upon receiving a transfer request from the vehicle 50, the output processing portion 115 may output the determination result to the vehicle 50 in accordance with the transfer request. It is noted that the output processing portion 115 may output each determination result to the vehicle 50 regardless of receiving or not receiving the transfer request. In addition, the output processing portion 115 may output each determination result to the information terminal 71, 72 as necessary, or in accordance with the transfer request received from the information terminal 71, 72.

In addition, the output processing portion 115 may output each determination result to the information terminal 72 installed in a repair business office that has been determined by the third determination processing portion 114 as being able to be reached, and may not output each determination result to the information terminal 72 installed in a repair business office that has been determined as not being able to be reached.

Abnormality Determination Process

In the following, with reference to the flowcharts of FIG. 7 and FIG. 8, a description is given of an example of the procedure of the abnormality determination process executed in the determination system 100, as well as a tire abnormality determination method of the present disclosure. The abnormality determination process is a process to determine whether or not the tire 1 being a determination object is normal, or whether or not a sign of an abnormality has occurred in the tire 1, or whether or not the tire 1 is in an abnormal state where it is dangerous for the tire 1 to travel. In the present embodiment, the abnormality determination process is performed on the tire 1 in the state of being mounted on the vehicle 50.

Figure 7:
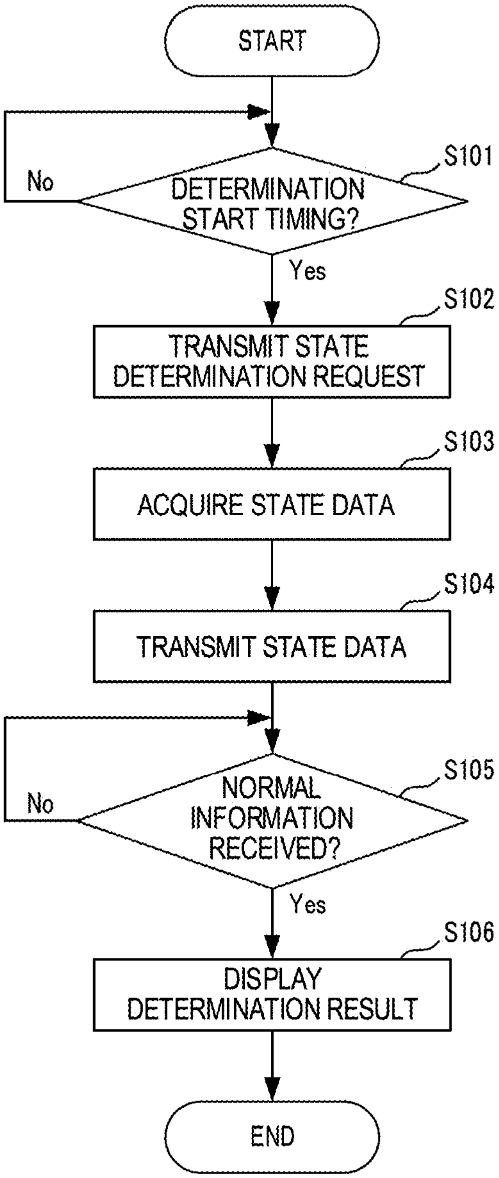
FIG. 7 is a flowchart showing an example of a procedure of an abnormality determination process executed by a control unit of the vehicle.

It is noted that each process of the flowchart shown in FIG. 7 is executed by the control portion 61 of the control unit 60 included in the vehicle 50. In addition, each process of the flowchart shown in FIG. 8 is executed by the control portion 11 of the abnormality determination apparatus 10. In addition, one or more steps included in the flowcharts of FIG. 7 and FIG. 8 may be omitted as necessary, and the steps may be executed in different orders as far as the same action and effect are caused.

As shown in FIG. 7, first, step S101 and the subsequent processes are performed in the vehicle 50. Specifically, upon determining in step S101 that a determination start timing has come, the control portion 61 of the control unit 60, in the next step S102, performs a process to transmit the state determination request for determining the state of the tire 1 to the abnormality determination apparatus 10.

The determination start timing is a timing to determine whether or not the tire 1 is normal, and, for example, is a timing that satisfies either or both of: a condition that a predetermined time period has passed since a previous determination; and a condition that the vehicle 50 has travelled a predetermined distance since the previous determination. In addition, the determination start timing may be a timing that satisfies either or both of: a condition that a travel cumulative time of the tire 1 has reached a predetermined set time; and a condition that a travel cumulative distance of the tire 1 has reached a predetermined set distance. These conditions are stored, for example, in the storage portion 62 of the vehicle 50. In addition, the determination start timing may be, for example, a timing when a driver or a passenger of the vehicle 50 has operated the operation switch 59 installed in the vehicle 50 and a determination start instruction has been input from the vehicle 50.

After the transmission of the state determination request, upon receiving a response signal to the state determination request from the abnormality determination apparatus 10, the control portion 61, in step S103, performs a process to acquire the state data. Specifically, the control portion 61 reads, from the storage portion 62 or the memory 67, the state data concerning the tire 1 that has been mounted. At this time, the control portion 61 may acquire the tire identification information concerning the tire 1 from the storage portion 62 or the memory 67.

Subsequently, the control portion 61 performs a process to transmit the state data to the abnormality determination apparatus 10 (S104). It is noted that the response signal is also a transmission request for transmitting the state data to the abnormality determination apparatus 10.

Figure 8:
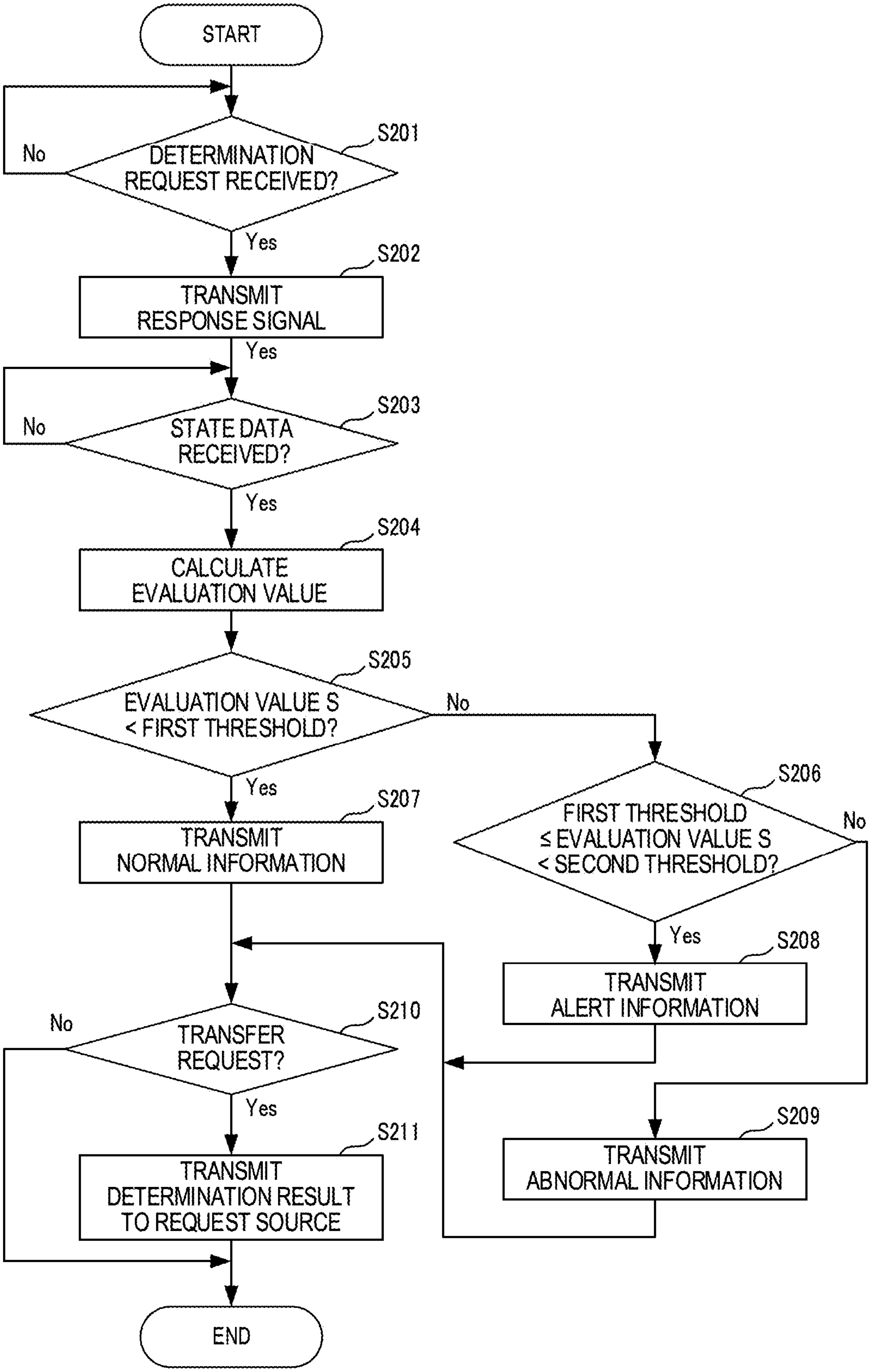
FIG. 8 is a flowchart showing an example of a procedure of the abnormality determination process executed by a control portion 11 of the abnormality determination apparatus.

As shown in FIG. 8, in the abnormality determination apparatus 10, upon receiving the state determination request from the vehicle 50 (S201), the control portion 11 transmits a response signal to the determination request to the vehicle 50 (S202). Subsequently, the control portion 11 receives the state data transmitted from the vehicle 50 (S203). The process of step S203 is executed by the data acquiring portion 111 of the control portion 11. It is noted that step S203 is an example of a related information acquisition step of the present disclosure.

Upon receiving, in step S203, the state data transmitted from the vehicle 50, the control portion 11 performs a process to calculate the evaluation value S by using the calculation formula shown in the formula (1) and the state data (S204).

After the evaluation value S is calculated, in the next step S205, the control portion 11 performs a process to determine whether or not the evaluation value S is lower than the first threshold. The determination step S205 is a process to determine whether or not the tire 1 is normal. When the evaluation value S is lower than the first threshold, the control portion 11 determines that the tire 1 is normal. Accordingly, upon determining that the evaluation value S is lower than the first threshold, the control portion 11 determines that the tire 1 is normal, and transmits normal information indicating that the tire 1 is normal to the vehicle 50 (S207).

On the other hand, when it is determined that the evaluation value S is equal to or higher than the first threshold (No at S205), the process of step S206 is performed.

In step S206, the control portion 11 performs a process to determine whether or not the evaluation value S is equal to or higher than the first threshold and lower than the second threshold. The determination step S206 is a process for determining whether or not a sign of an abnormality has occurred in the tire 1. When the evaluation value S is equal to or higher than the first threshold and lower than the second threshold, the control portion 11 determines that a sign of an abnormality has occurred in the tire 1. Accordingly, upon determining that the evaluation value S is equal to or higher than the first threshold and lower than the second threshold, the control portion 11 determines that a sign of an abnormality has occurred in the tire 1, and transmits, to the vehicle 50, alert information indicating that a sign of an abnormality has occurred in the tire 1 (S208).

On the other hand, when it is determined in step S206 that the evaluation value S is equal to or higher than the second threshold (No at S206), the control portion 11 determines that an abnormality has occurred in the tire 1, and transmits, to the vehicle 50, abnormal information indicating that the tire 1 is in the abnormal state (S209).

The processes of steps S206 to S207 are executed by the first determination processing portion 112 of the control portion 11. In addition, steps S206 to S207 are an example of a first determination step of the present disclosure.

The processes of steps S207 to S209 are executed by the output processing portion 115 of the control portion 11. In addition, steps S207 to S209 are an example of an output step of the present disclosure.

In addition, upon receiving a transfer request that requests a transfer of the determination result (the normal information, the alert information, or the abnormal information) of the first determination processing portion 112 (S210), the control portion 11 transmits the determination result to the request source of the transfer request (S211). For example, when the control portion 11 has received the transfer request from the information terminal 71, 72, the control portion 11 transmits the determination result to the information terminal 71, 72. This ends the series of processes. On the other hand, when the transfer request has not been received, the series of processes ends after the transmission process of any of steps S207 to S209 is completed.

As shown in FIG. 7, in the vehicle 50, upon receiving the determination result from the abnormality determination apparatus 10 (S105), the control portion 61 performs a process to output the determination result to the display device 502 (S106). Specifically, the control portion 61 performs a process to display the determination result on the display device 502 of the vehicle 50. In addition, when the price information and the repair effect are included in the repair agent information, it displays these pieces of information on the display device 502, too. Thereafter, the series of processes end.

As described above, in the determination system 100 of the present embodiment, it is determined, based on the state data that may exert influence on the deterioration of the tire 1, whether or not the tire 1 is normal, or whether or not a sign of an abnormality has occurred in the tire 1, or whether or not the tire 1 is in an abnormal state where it is dangerous for the tire 1 to travel. And the determination result is output to the display device 502, the information terminal 71, and/or the information terminal 72. With this configuration, the user who has confirmed the determination result from the display device 502 and the information terminal 71 can recognize that a sign of an abnormality has occurred in the tire 1 or that an abnormality has occurred in the tire 1, before the user him/herself experiences the abnormality of the tire 1 during travelling of the vehicle 50. In addition, when the determination result is output to the information terminal 72, a repair worker of the repair business office can recognize the state of the tire 1 before the vehicle 50 is brought into the repair business office.

Second Embodiment

Figure 9:
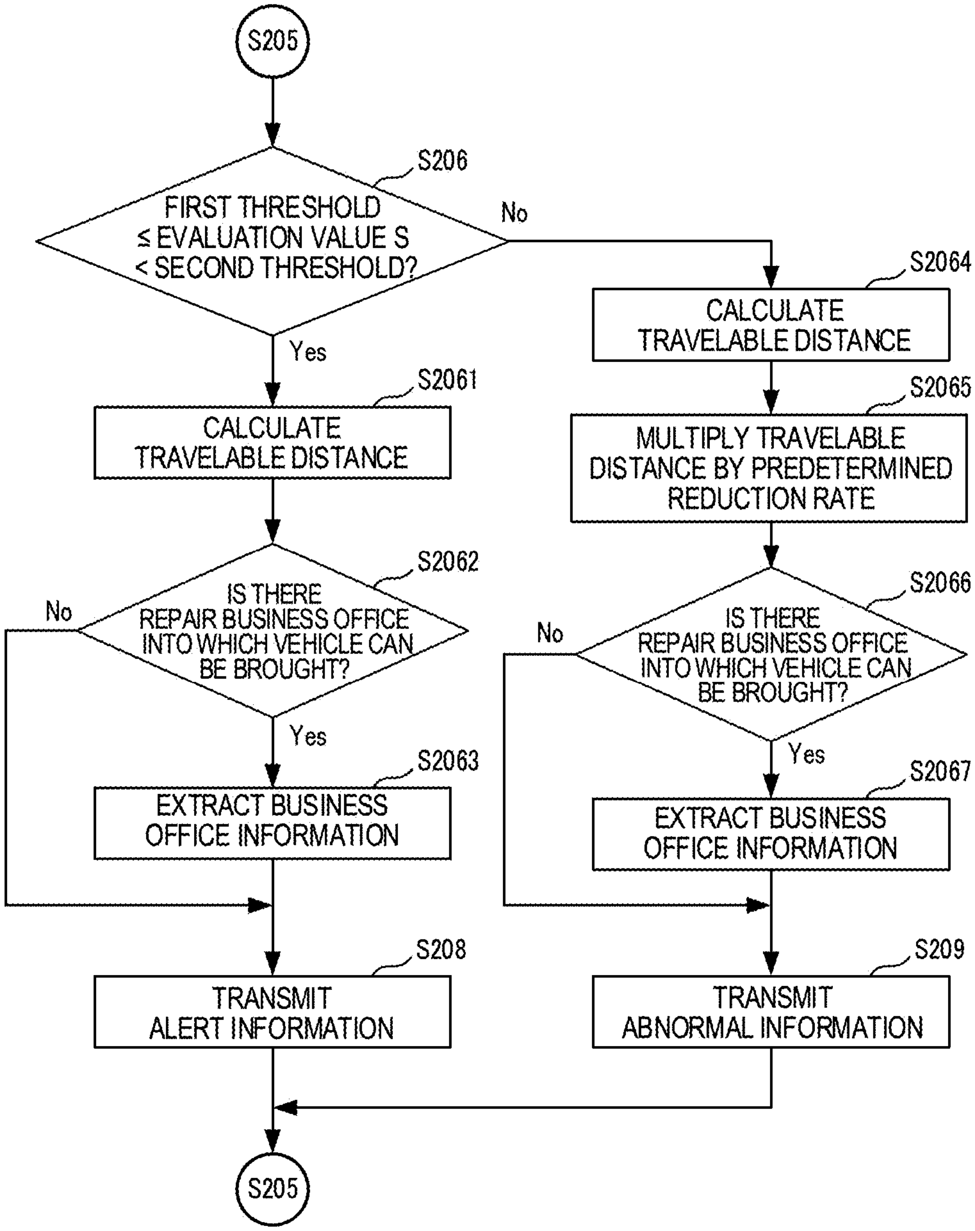
FIG. 9 is a flowchart showing another example of the procedure of the abnormality determination process executed by the control portion 11 of the abnormality determination apparatus according to a second embodiment of the present disclosure.

The following describes a second embodiment of the present disclosure with reference to FIG. 9. The second embodiment differs from the first embodiment in a part of the repair agent determination process executed in the abnormality determination apparatus 10. In the following, differences from the first embodiment are described, and description of common configurations is omitted.

FIG. 9 is a flowchart showing another example of the abnormality determination process executed by the control portion 11 of the abnormality determination apparatus 10. The abnormality determination process of the present embodiment is different from that of the above-described first embodiment in the content of the process after it is determined that a sign of an abnormality has occurred in the tire 1, and the process after it is determined that an abnormality has occurred in the tire 1. Otherwise, the processes are the same.

As shown in FIG. 9, upon a determination in step S206 that the evaluation value S is equal to or higher than the first threshold and lower than the second threshold, the control portion 11, in the next step S2061, performs a process to calculate the travelable distance that can be travelled until the tire 1 becomes the disabled state. The process of step S2061 and the process of step S2064 described below are executed by the second determination processing portion of the control portion 11.

Subsequently, in step S2062, the control portion 11 performs a process to determine whether or not there is a repair business office located at a position that can be reached before the vehicle 50 becomes the disabled state. The process of step S2062 and the process of step S2066 described below are executed by the third determination processing portion of the control portion 11. For example, the control portion 11 determines whether or not the business office data contains a repair business office that is located in a range of the travelable distance from the current position of the vehicle 50.

Upon determining that the business office data contains the repair business office, the control portion 11 extracts, from the business office data, a piece of business office information indicating the repair business office (S2063), and transmits the alert information, together with the piece of business office information, to the vehicle 50 (S208).

On the other hand, as shown in FIG. 9, when it is determined in step S206 that the evaluation value S is equal to or higher than the second threshold, the control portion 11, in the next step S2064, performs a process to calculate the travelable distance that can be travelled until the tire 1 becomes the disabled state.

In the next step S2065, the control portion 11 performs a process to reduce the travelable distance by a predetermined amount by multiplying the travelable distance by a predetermined reduction rate. It is considered that when the tire 1 is in the abnormal state, compared with the case where a sign of an abnormality has occurred in the tire 1, it is preferable to multiply the travelable distance by the reduction rate, in order to secure the travelling of the vehicle 50.

Subsequently, in step S2066, the control portion 11 performs a process to determine whether or not there is a repair business office located at a position that can be reached before the vehicle 50 becomes the disabled state.

Upon determining that the business office data contains the repair business office, the control portion 11 extracts, from the business office data, a piece of business office information indicating the repair business office (S2067), and transmits the abnormal information, together with the piece of business office information, to the vehicle 50 (S209).

As described above, in the determination system 100 according to the second embodiment, too, it is determined appropriately, based on the state data that may exert influence on the deterioration of the tire 1, whether or not the tire 1 is normal, or whether or not a sign of an abnormality has occurred in the tire 1, or whether or not the tire 1 is in the abnormal state where it is dangerous for the tire 1 to travel.

It is noted that although the second embodiment has described an example case where the travelable distance is calculated in steps S2061 and S2064, for example, either or both of the travelable distance and the travelable time may be calculated in steps S2061 and S2064. In addition, the control portion 11 may calculate the speed limit in steps S2061 and S2064. In this case, the travelable distance may be calculated by multiplying the speed limit by the travelable time.

In addition, although the first and second embodiments have described an example case where the first determination processing portion 112 calculates the evaluation value S by using the number of tire rotations $x_1$, the average speed $x_2$, the number of times of occurrence of excessive acceleration $x_3$, the number of times of occurrence of excessive lateral direction acceleration $x_4$, the vibration value $x_5$, the average temperature $x_6$, the tread wear amount $x_7$, the uneven wear amount $x_8$, the number of times of occurrence of excessive steering angle $x_9$, the number of times of brake operation $x_{10}$, the number of times of occurrence of excessive step amount $x_{11}$, the coefficient $t_k$, the coefficient h, and the calculation formula of the formula (1), the present disclosure is not limited to the calculation example. For example, the evaluation value S may be calculated by using one or more of each numerical value $x_k$ of the above-described items. In addition, the sum total of each numerical value $x_k$ may be set as the evaluation value S, without using the coefficient $t_k$ and the coefficient h.

In addition, although the first and second embodiments have described a processing example where presence or absence of a sign of an abnormality and presence or absence of an abnormality in the tire 1 are determined by using the evaluation value S calculated based on the state data, the present disclosure is not limited to the processing example. For example, the control portion 11 may determine presence or absence of a sign of an abnormality by using the evaluation value S that has been calculated based on the state data excluding the vibration value $x_5$, and determine presence or absence of an abnormality by using the vibration value $x_5$ that is different from this evaluation value S. In this case, the state data excluding the vibration value $x_5$ is an example of first related information of the present disclosure, and the vibration value $x_5$ is an example of second related information of the present disclosure.

In addition, the evaluation value S may be calculated, by using the calculation formula of the formula (1), based on the the state data that includes the number of years elapsed from the manufacture of the tire 1 that is calculated from the manufacturing year/month/day of the tire 1 stored in the memory 67. That is, a weight coefficient corresponding to the number of elapsed years may be set and the evaluation value S may be calculated by using the weight coefficient and the formula (1). In addition, when there is an error between the moving distance calculated from the position information of the GPS receiving portion 64 and the moving distance calculated from the rotation speed of the tire 1, it is considered that the larger the error is, the smaller the outer diameter size of the tire 1 during travelling is than a predefined size, and there is a possibility that the tire 1 is damaged. For this reason, the evaluation value S may be calculated, by using the calculation formula of the formula (1), based on the state data that incudes the error. That is, a weight coefficient corresponding to the error may be set, and the evaluation value S may be calculated by using the weight coefficient and the formula (1).

It is noted that although the first and second embodiments have described an example configuration where the data acquisition portion 111, the first determination processing portion 112, the second determination processing portion 113, the third determination processing portion 114, and the output processing portion 115 are realized by the control portion 11 of the abnormality determination apparatus 10, a part or all of these processing portions may be realized by the control portion 61 of the control unit 60 of the vehicle 50, a processor in a vehicle-mounted terminal installed in the vehicle 50, or a control portion of the information terminal 71, 72. That is, the process of each step of the flowchart shown in FIG. 8 or FIG. 9 may be executed by any of the abnormality determination apparatus 10, the vehicle 50, and the information terminal 71, 72. In addition, the conversion processing portion 611 realized by the control portion 61 of the control unit 60 may be realized by the control portion 11 of the abnormality determination apparatus 10 or the control portion of the information terminal 71, 72.

Third Embodiment

It is noted that the calculation example in which the evaluation value S is calculated by using the calculation formula of the formula (1) is only an example. The following describes, as a third embodiment of the present disclosure, another processing example of the abnormality determination process performed by the first determination processing portion 112, with reference to FIG. 10. Here, FIG. 10 is a block diagram showing a configuration of the first determination processing portion 112.

Figure 10:
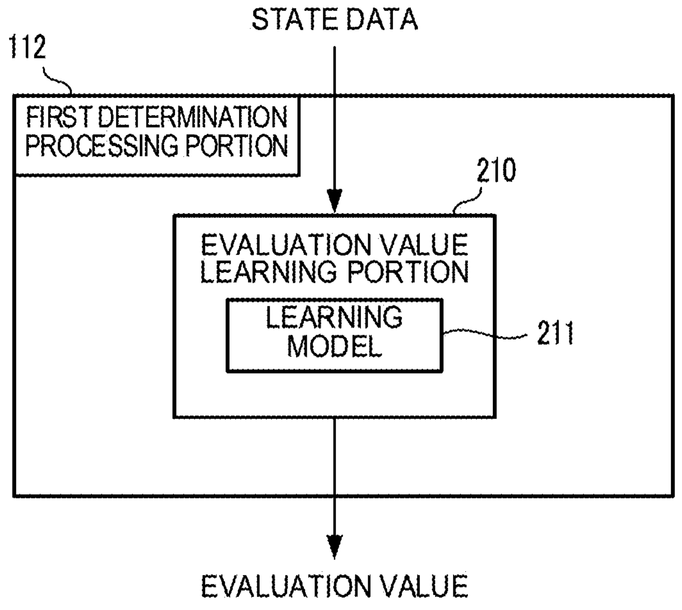
FIG. 10 is a block diagram showing a configuration of a first determination processing portion according to a third embodiment of the present disclosure.

As shown in FIG. 10, the first determination processing portion 112 includes an evaluation value learning portion 210 configured to perform a process to obtain the evaluation value S. The evaluation value learning portion 210 obtains an evaluation value of the tire 1 by using a learning model 211 (an example of a learning model of the present disclosure) constructed based on teacher data preliminarily prepared. Here, the teacher data is information used to generate the learning model 211 and is stored in a storage area assigned in the database 30. In addition, the learning model 211 is, for example, a learned model that has preliminarily been learned by a machine learning.

In general, in the machine learning, algorithms such as supervised learning, unsupervised learning, and reinforcement learning are used, and in realizing these methods, a method called "deep learning" is used, wherein the deep learning learns extracting a feature quantity itself. The present embodiment describes, as one example, the learning model 211 that has been learned by the supervised learning.

The learning model 211 is a learned model that has been preliminarily generated based on the teacher data stored in the database portion 30 and a predetermined algorithm. The algorithm is configured to learn, from the teacher data that has preliminarily been input, a relationship between an input and an output thereof.

The teacher data is a dataset for learning the learning model 211. The teacher data is used to learn a prediction function included in the learning model 211. The teacher data includes: input values such as the state data of a large number of sample tires; and the evaluation values (output values) as the answer to these data. The teacher data includes a large number of sets of combination data that are each composed of an input value and an output value.

When the evaluation value is calculated by using the learning model 211, for example, history information of detection values detected by the sensors 51 to 58 during travelling of the vehicle 50 may be used as the state data. In addition, for example, various types of history data such as history data of the travel position measured by the GPS receiving portion 64 and history data of the travel speed and acceleration of the vehicle 50 may be used as the state data.

By giving the teacher data as such to the learning model 211, the learning model 211 analyzes features, useful rules, knowledge representation, determination criteria, and so on in the teacher data, and learns a prediction function that indicates a relationship between an input value and an output value. When such a relationship is learned, it is possible to predict the evaluation value (output value) of the tire 1 by applying the state data (input value) of the tire 1 for which the evaluation value (output value) is unknown, to the prediction function.

In the present embodiment, the first determination processing portion 112 inputs the state data to the learning model 211, and the learning model 211 outputs the evaluation value corresponding to the input state data.

It is noted that when the learning model 211 has been learned by the teacher data, the teacher data does not need to be stored in the database portion 30.

By calculating the evaluation value by using the learning model 211 as such improves the accuracy of the evaluation value, thereby further improving the accuracy of the determination process performed by the first determination processing portion 112.

The embodiments of the present disclosure described above include the following disclosure items (1) to (14).

Disclosure item (1) according to an aspect of the present disclosure is a tire abnormality determination system including: a related information acquisition portion configured to acquire deterioration-related information that may exert influence on deterioration of a non-pneumatic tire mounted on a vehicle; a first determination processing portion configured to determine, based on the deterioration-related information, at least one of: presence or absence of a sign of an abnormality in the non-pneumatic tire; and presence or absence of the abnormality in the non-pneumatic tire; and an output processing portion configured to output a first determination result of the first determination processing portion to a predetermined output destination.

With the above-described configuration, it is possible to determine presence or absence of a sign of an abnormality or presence or absence of the abnormality that occurs in the non-pneumatic tire, and notify a determination result thereof to an owner or a driver of the vehicle, a repair business office of the vehicle, or the like via a predetermined output terminal.

Disclosure item (2) is the tire abnormality determination system according to the disclosure item (1), wherein the first determination processing portion determines that the sign of the abnormality has occurred in the non-pneumatic tire when a predetermined evaluation value obtained based on the deterioration-related information is equal to or higher than a predetermined first reference value and lower than a second reference value, and determines that the abnormality has occurred in the non-pneumatic tire when the evaluation value is equal to or higher than the second reference value.

Disclosure item (3) is the tire abnormality determination system according to the disclosure item (2), wherein the first determination processing portion obtains the evaluation value by using a learning model that inputs the deterioration-related information and outputs the evaluation value.

Disclosure item (4) is the tire abnormality determination system according to any one of the disclosure items (1) to (3), further including a second determination processing portion configured to, upon a determination by the first determination processing portion that the sign of the abnormality or the abnormality is present, determine at least one or more of: a travelable time until the non-pneumatic tire becomes a disabled state in which the non-pneumatic tire cannot travel due to the abnormality; a travelable distance until the non-pneumatic tire becomes the disabled state; and a speed limit being a speed at which the non-pneumatic tire can travel safely. The output processing portion further outputs a second determination result of the second determination processing portion.

Disclosure item (5) is the tire abnormality determination system according to any one of the disclosure item (4), wherein the output processing portion outputs at least one or more of the travelable time, the travelable distance, and the speed limit when the first determination processing portion determines that the sign of the abnormality is present in the non-pneumatic tire. In addition, the output processing portion outputs a numerical value that is obtained by multiplying at least one or more of the travelable time, the travelable distance, and the speed limit by a predetermined reduction rate when the first determination processing portion determines that the abnormality is present in the non-pneumatic tire.

Disclosure item (6) is the tire abnormality determination system according to the disclosure item (4) or (5), further including: a vehicle position information acquisition portion configured to acquire vehicle position information indicating a position of the vehicle; and a third determination processing portion configured to determine whether or not a repair business office that can be reached by the vehicle mounted with the non-pneumatic tire for which it has been determined that the sign of the abnormality or the abnormality is present, is included in business office position data that includes business office position information indicating: a position of a business office where a repair of the abnormality of the non-pneumatic tire is available; or a position of a business office where a replacement of the non-pneumatic tire is available. The output processing portion further outputs a third determination result of the third determination processing portion.

Disclosure item (7) is the tire abnormality determination system according to any one of the disclosure items (1) to (6), wherein the non-pneumatic tire includes: an annular tread portion having a ground contact surface; a hub portion disposed inside the tread portion in a radial direction thereof; and a spoke portion coupling the tread portion to the hub portion and composed of one or more spokes that are elastically deformable. The first determination processing portion determines presence or absence of the sign of the abnormality or presence or absence of the abnormality in one or more of the tread portion, the hub portion, and the spoke portion.

Disclosure item (8) is the tire abnormality determination system according to any one of the disclosure items (1) to (7), wherein the output processing portion outputs to either or both of: a display device loaded in the vehicle mounted with the non-pneumatic tire for which the first determination processing portion has determined that the sign of the abnormality or the abnormality is present; and a terminal apparatus associated with a driver or an owner of the vehicle.

Disclosure item (9) is the tire abnormality determination system according to any one of the disclosure item (6), wherein the output processing portion outputs to a terminal apparatus associated with the business office.

Disclosure item (10) is the tire abnormality determination system according to any one of the disclosure items (1) to (9), wherein the deterioration-related information is at least one or more of a vibration value of a tire, an acceleration applied to the tire, the number of rotations of the tire, a temperature of the tread portion of the tire, a wear amount of the tread portion of the tire, a travel distance of the vehicle, a travel time of the vehicle, a travel speed of the vehicle, an acceleration of the vehicle, a travel route of the vehicle, a steering angle of the vehicle, the number of times of braking in the vehicle, and an operation amount of a brake in the vehicle, wherein the tire is the non-pneumatic tire that is in use by being mounted on the vehicle.

Disclosure item (11) is the tire abnormality determination system according to any one of the disclosure items (1) to (10), wherein when the deterioration-related information includes: first related information including one or more pieces of information; and second related information including one or more pieces of information that are different from the one or more pieces of information of the first related information, the first determination processing portion determines presence or absence of the sign of the abnormality based on the first related information, and determines presence or absence of the abnormality based on the second related information.

Disclosure item (12) according to another aspect of the present disclosure is a tire abnormality determination apparatus including: a related information acquisition portion configured to acquire deterioration-related information that may exert influence on deterioration of a non-pneumatic tire mounted on a vehicle; a first determination processing portion configured to determine, based on the deterioration-related information, at least one of: presence or absence of a sign of an abnormality in the non-pneumatic tire; and presence or absence of the abnormality in the non-pneumatic tire; and an output processing portion configured to output a first determination result of the first determination processing portion to a predetermined output destination.

Disclosure item (13) according to a further aspect of the present disclosure is a tire abnormality determination method including: a related information acquisition step of acquiring deterioration-related information that may exert influence on deterioration of a non-pneumatic tire mounted on a vehicle; a first determination step of determining, based on the deterioration-related information, at least one of: presence or absence of a sign of an abnormality in the non-pneumatic tire; and presence or absence of the abnormality in the non-pneumatic tire; and an output step of outputting a first determination result of the first determination step to a predetermined output destination, wherein each step is executed by one or more processors.

Disclosure item (14) according to a still further aspect of the present disclosure is a program for causing one or more processors to execute: a related information acquisition step of acquiring deterioration-related information that may exert influence on deterioration of a non-pneumatic tire mounted on a vehicle; a first determination step of determining, based on the deterioration-related information, at least one of: presence or absence of a sign of an abnormality in the non-pneumatic tire; and presence or absence of the abnormality in the non-pneumatic tire; and an output step of outputting a first determination result of the first determination step to a predetermined output destination. The present disclosure may be a computer-readable recording medium in which the program has been recorded in a non-transitory manner.

The invention claimed is:

1. A tire abnormality determination system comprising:

a related information acquisition portion configured to acquire deterioration-related information that exerts influence on deterioration of a non-pneumatic tire mounted on a vehicle;

a first determination processing portion configured to determine, based on the deterioration-related information, at least one of: presence or absence of a sign of an abnormality in the non-pneumatic tire; and presence or absence of the abnormality in the non-pneumatic tire; and an output processing portion configured to output a first determination result of the first determination processing portion to a predetermined output destination, wherein the non-pneumatic tire includes:

an annular tread portion having a ground contact surface;

a hub portion disposed inside the tread portion in a radial direction thereof; and a spoke portion coupling the tread portion to the hub portion and composed of one or more spokes that are elastically deformable, and the first determination processing portion determines presence or absence of the sign of the abnormality or presence or absence of the abnormality in one or more of the tread portion, the hub portion, and the spoke portion.

2. The tire abnormality determination system according to claim 1, wherein the output processing portion outputs to either or both of:

a display device loaded in the vehicle mounted with the non-pneumatic tire for which the first determination processing portion has determined that the sign of the abnormality or the abnormality is present; and a terminal apparatus associated with a driver or an owner of the vehicle.

3. The tire abnormality determination system according to claim 1, wherein the deterioration-related information is at least one or more of a vibration value of a tire, an acceleration applied to the tire, the number of rotations of the tire, a temperature of the tread portion of the tire, a wear amount of the tread portion of the tire, a travel distance of the vehicle, a travel time of the vehicle, a travel speed of the vehicle, an acceleration of the vehicle, a travel route of the vehicle, a steering angle of the vehicle, the number of times of braking in the vehicle, and an operation amount of a brake in the vehicle, wherein the tire is the non-pneumatic tire that is in use by being mounted on the vehicle.

4. The tire abnormality determination system according to claim 1, wherein when the deterioration-related information includes:

first related information including one or more pieces of information; and second related information including one or more pieces of information that are different from the one or more pieces of information of the first related information, the first determination processing portion determines presence or absence of the sign of the abnormality based on the first related information, and determines presence or absence of the abnormality based on the second related information.

5. The tire abnormality determination system according to claim 1, wherein the first determination processing portion determines that the sign of the abnormality has occurred in the non-pneumatic tire when a predetermined evaluation value obtained based on the deterioration-related information is equal to or higher than a predetermined first reference value and lower than a second reference value, and determines that the abnormality has occurred in the non-pneumatic tire when the evaluation value is equal to or higher than the second reference value.

6. The tire abnormality determination system according to claim 5, wherein the first determination processing portion obtains the evaluation value by using a learning model that inputs the deterioration-related information and outputs the evaluation value.

7. The tire abnormality determination system according to claim 1, further comprising a second determination processing portion configured to, upon a determination by the first determination processing portion that the sign of the abnormality or the abnormality is present, determine at least one or more of: a travelable time until the non-pneumatic tire becomes a disabled state in which the non-pneumatic tire cannot travel due to the abnormality; a travelable distance until the non-pneumatic tire becomes the disabled state; and a speed limit being a speed at which the non-pneumatic tire can travel safely, wherein the output processing portion further outputs a second determination result of the second determination processing portion.

8. The tire abnormality determination system according to claim 7, wherein the output processing portion outputs at least one or more of the travelable time, the travelable distance, and the speed limit when the first determination processing portion determines that the sign of the abnormality is present in the non-pneumatic tire, and outputs a numerical value that is obtained by multiplying at least one or more of the travelable time, the travelable distance, and the speed limit by a predetermined reduction rate when the first determination processing portion determines that the abnormality is present in the non-pneumatic tire.

9. The tire abnormality determination system according to claim 7, further comprising:

a vehicle position information acquisition portion configured to acquire vehicle position information indicating a position of the vehicle; and a third determination processing portion configured to determine whether or not a repair business office that can be reached by the vehicle mounted with the non-pneumatic tire for which it has been determined that the sign of the abnormality or the abnormality is present, is included in business office position data that includes business office position information indicating: a position of a business office where a repair of the abnormality of the non-pneumatic tire is available; or a position of a business office where a replacement of the non-pneumatic tire is available, wherein the output processing portion further outputs a third determination result of the third determination processing portion.

10. The tire abnormality determination system according to claim 9, wherein the output processing portion outputs to a terminal apparatus associated with the business office.

11. A tire abnormality determination apparatus comprising:

a related information acquisition portion configured to acquire deterioration-related information that exerts influence on deterioration of a non-pneumatic tire mounted on a vehicle;

a first determination processing portion configured to determine, based on the deterioration-related information, at least one of: presence or absence of a sign of an abnormality in the non-pneumatic tire; and presence or absence of the abnormality in the non-pneumatic tire; and an output processing portion configured to output a first determination result of the first determination processing portion to a predetermined output destination, wherein the non-pneumatic tire includes:

an annular tread portion having a ground contact surface;

a hub portion disposed inside the tread portion in a radial direction thereof; and a spoke portion coupling the tread portion to the hub portion and composed of one or more spokes that are elastically deformable, and the first determination processing portion determines presence or absence of the sign of the abnormality or presence or absence of the abnormality in one or more of the tread portion, the hub portion, and the spoke portion.

12. A tire abnormality determination method in which one or more processors execute:

a related information acquisition step of acquiring deterioration-related information that exerts influence on deterioration of a non-pneumatic tire mounted on a vehicle;

a first determination step of determining, based on the deterioration-related information, at least one of: presence or absence of a sign of an abnormality in the non-pneumatic tire; and presence or absence of the abnormality in the non-pneumatic tire; and an output step of outputting a first determination result of the first determination step to a predetermined output destination, wherein the non-pneumatic tire includes:

an annular tread portion having a ground contact surface;

a hub portion disposed inside the tread portion in a radial direction thereof; and a spoke portion coupling the tread portion to the hub portion and composed of one or more spokes that are elastically deformable, and the first determination step determines presence or absence of the sign of the abnormality or presence or absence of the abnormality in one or more of the tread portion, the hub portion, and the spoke portion.

13. A non-transitory computer-readable recording medium containing a program for causing one or more processors to execute:

a related information acquisition step of acquiring deterioration-related information that exerts influence on deterioration of a non-pneumatic tire mounted on a vehicle;

a first determination step of determining, based on the deterioration-related information, at least one of: presence or absence of a sign of an abnormality in the non-pneumatic tire; and presence or absence of the abnormality in the non-pneumatic tire; and an output step of outputting a first determination result of the first determination step to a predetermined output destination, wherein the non-pneumatic tire includes:

an annular tread portion having a ground contact surface;

a hub portion disposed inside the tread portion in a radial direction thereof; and a spoke portion coupling the tread portion to the hub portion and composed of one or more spokes that are elastically deformable, and the first determination step determines presence or absence of the sign of the abnormality or presence or absence of the abnormality in one or more of the tread portion, the hub portion, and the spoke portion.

* * * * *